United States Patent [19]

Shinosky, Jr.

[11] 4,065,644
[45] Dec. 27, 1977

[54] ELECTRO-OPTICAL AND ELECTRONIC SWITCHING SYSTEMS

[76] Inventor: Leonard W. Shinosky, Jr., 3714 White Pine Road, Apt. C, Baltimore, Md. 21220

[21] Appl. No.: 760,607

[22] Filed: Jan. 19, 1977

Related U.S. Application Data

[63] Continuation-in-part of Ser. No. 573,177, April 30, 1975, abandoned.

[51] Int. Cl.² .............................................. H04B 9/00
[52] U.S. Cl. ............................. 179/18 GF; 179/15 A; 250/199; 315/372
[58] Field of Search .......... 179/18 GF, 18 GE, 15 A, 179/15 AT, 15 AZ; 250/199; 315/367, 374, 372, 30; 340/166 R, 147 R

[56] References Cited

U.S. PATENT DOCUMENTS

| | | | |
|---|---|---|---|
| 2,729,704 | 1/1956 | Levy et al. | 179/15 A |
| 2,941,074 | 6/1960 | Poole | 315/372 |
| 3,120,581 | 2/1964 | Brooks et al. | 179/18 GF |
| 3,191,040 | 6/1965 | Critchlow | 179/18 GF |
| 3,838,278 | 9/1974 | Duguay et al. | 250/199 |
| 3,849,604 | 11/1974 | Benes et al. | 250/199 |
| 3,852,640 | 12/1974 | McCarthy | 315/367 |
| 3,985,975 | 10/1976 | Steensma | 179/18 GF |

OTHER PUBLICATIONS

Lasers:Devices and Systems–Part II, Dulberger and Vogel, Electronics, Nov. 3, 1961, pp. 40–44.

Primary Examiner—Thomas A. Robinson
Attorney, Agent, or Firm—Griffin, Branigan & Butler

[57] ABSTRACT

A switching system, specifically useful as a telephone central switching system, to establish a number of simultaneous but independent communication links between selected lines, comprising: (1) a CRT to transmit signals in the form of modulated light beams, (2) lenses to focus and direct the light generated, (3) an array of photosensors each connected to a different communication line, and (4) electronic controls to direct the beam as required. Also disclosed are electronic embodiments of the foregoing; time division multiplex and composite systems to expand the basic system; and also arrangements to facilitate adaptation of the system to telephone applications. The system avoids much of the hardware and circuit complications of prior switching systems.

42 Claims, 9 Drawing Figures

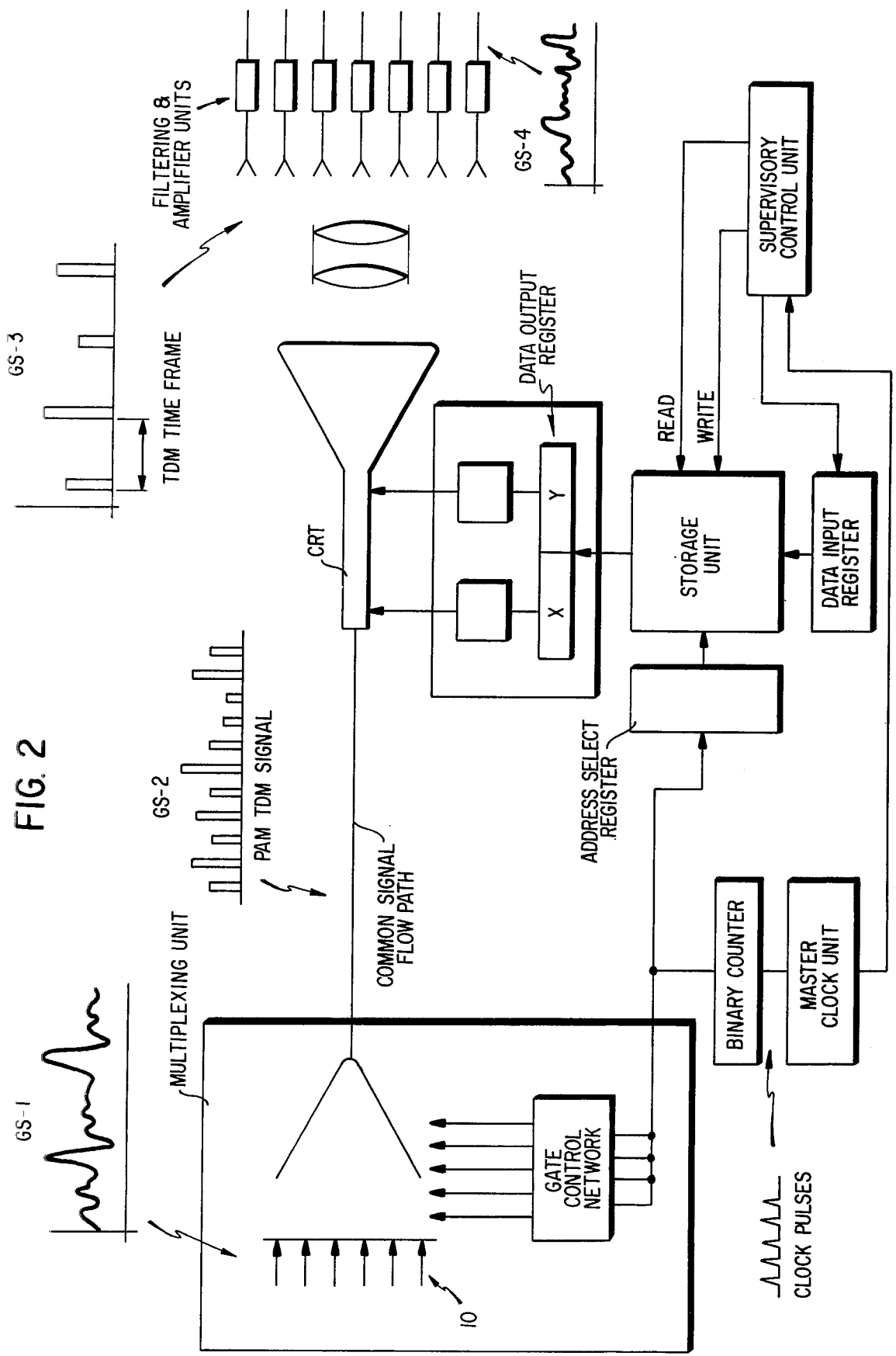

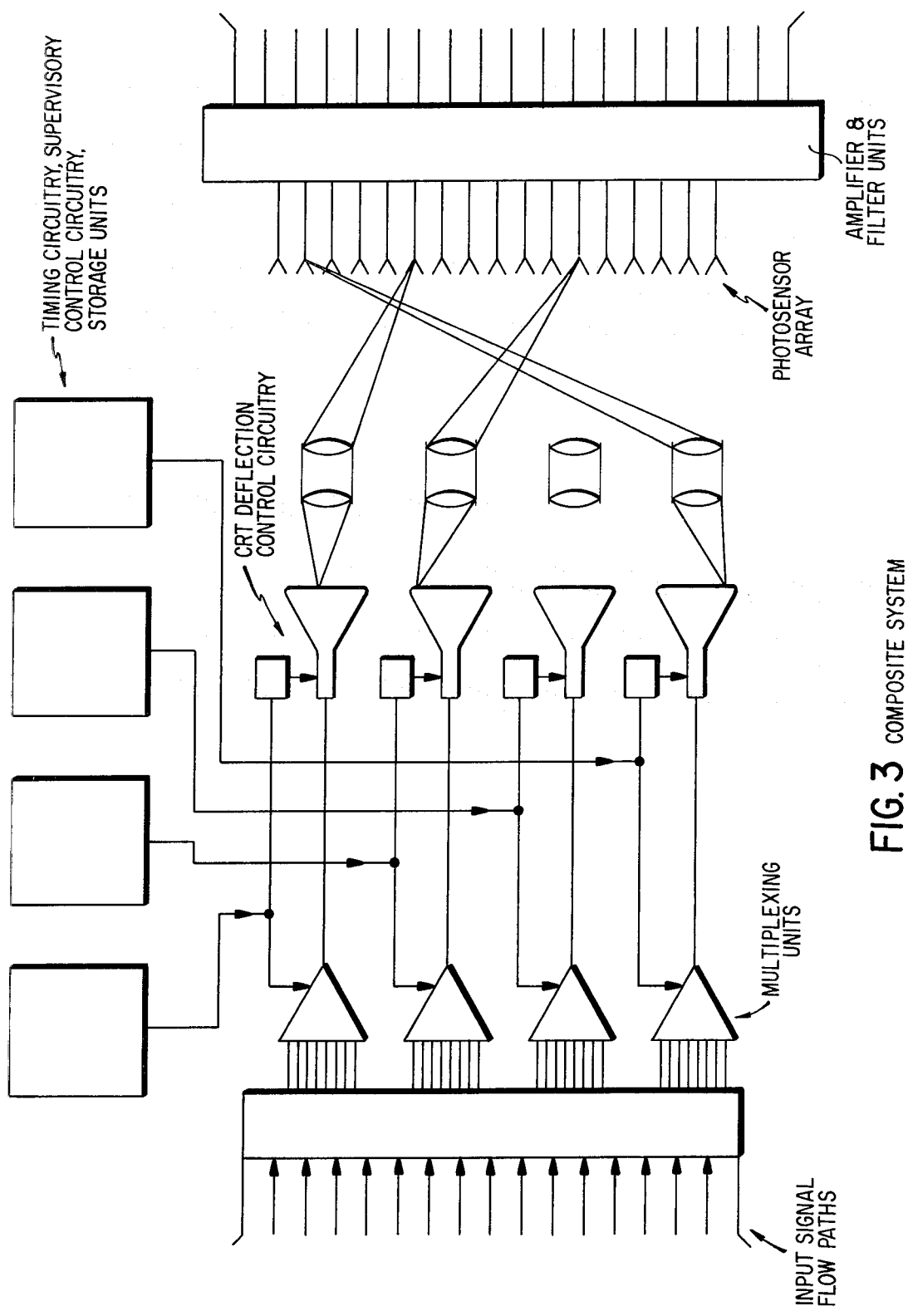
FIG. 3 COMPOSITE SYSTEM

ELECTRO-OPTICAL AND ELECTRONIC SWITCHING SYSTEMS

RELATED PATENT APPLICATIONS

This application is a continuation-in-part of abandoned application Ser. No. 573,177, entitled Electro-Optical Switching Systems, filed Apr. 30, 1975; and contains considerable common subject matter with said application, reliance upon which for credit as to filing date hereby being claimed.

BACKGROUND OF THE INVENTION

Field of the Invention

This invention is concerned with a system which can achieve communication links between a plurality of spatially separated entities. In this sense, the device to be described herein could be applied to any circumstance which required this type of function. However, there is a specific context of application in which the capabilities of the invention are most clearly demonstrated, and in which its utility and advantages over prior art can be most clearly presented. This said context is that of a telephone central office switching system, and therefore it is within this context that the use of the invention will be recommended, and its advantages over prior art pointed out.

It is the basic function of a telephone switching system to achieve a communications link between two or more telephones. In the performance of this function, various automatic systems have evolved; but all of these systems can be grouped into two general categories:

I. space division systems: which use physically distinct paths to achieve communication between telephones;

II. time division systems: which use a time-shared common path between telephone terminations at the switching system itself.

This discourse will first concern itself with the different types of space division systems. These can be divided into two general catagories:

1. electro-mechanical
2. electronic

The electro-mechanical systems, of course, preceded the electronic systems, and even some of the earlier types of electro-mechanical systems are still in widespread use today. The first type of electro-mechanical system that was of major significance was the step-by-step system. This system used banks of the Strowger rotary-type switch along with the appropriate supportive equipment to achieve the required switching functions.

Increased numbers of subscribers posed problems of maintaining satisfactory speed in the switching process itself, and of dealing adequately with the inherent complexity of a larger sized system. As a result, a number of other electro-mechanical systems evolved. These systems used various switching arrangements, and various types of electromechanical components. The crossbar system is one such system, and features a trend that was developed extensively in the later electronic systems: that of common or centralized control of the switching process.

The search for a system that could handle ever increasing numbers of subscribers and traffic loading conditions, and also possessed the possibility of fulfilling long term anticipated increased subscriber demands, led to the development of electronic switching systems. Systems of this type feature an electronic central processor which functions as a central supervisory control unit for the entire switching system. The #1 ESS, developed by Bell Telephone Laboratories, is a good representative example of such a system. In addition to an electronic centralized control, this system featured a new switching element, the ferreed cross-point switch. This switch had magnetic retentive properties which allowed it to remain in a closed position upon the application of a momentary pulse. This fact facilitated its use as a switching element within the network of the system. Also of significance was the ESS technique for detecting the off-hook status of a subscriber telephone. Off-hook detection is one of the basic functions that must be performed by a telephone switching system. The ESS utilized a new type of magnetic sensing device, the ferrod sensor, which reacted to a change in impedance of the subscriber line. Banks of these sensors were used, and they were repeatedly scanned by the central processor unit to detect an off-hook status.

The electronic systems outperformed their electro-mechanical counterparts in a number of areas:

1. They had improved speed, which is very important for a large and complex system.
2. They had improved versatility. This was realized in two areas:
   a. Adaptability of the system to different operating requirements: This adaptability arises from the fact that the control functions in an electronic systems are not "hard-wired," but rather are a part of a stored program, and hence machine operation can be altered simply by changing the program.
   b. If it became desireable to increase the size of a given installation, much easier implementation of this was available with an electronic system.
3. Their overall traffic handling capability was increased.
4. Maintenance features were improved due to diagnostic routines included in the central processor programs.

On an initial cost basis, electronic systems tend to exceed the cost of electro-mechanical systems, but it is widely held that this fact is adequately compensated for by the long term advantage of flexibility and low maintenance cost provided for by an electronic switching system.

Upon observing the above cited systems, it can be seen that there have been a series of improvements which have increased both the speed and versatility of the systems. Among these improvements are more durable and more sophisticated components, and the use of centralized electronic control. Nevertheless, all of these systems actually achieve telephone-telephone interconnection by closing the proper combination of electro-mechanical switching elements, which individual elements are part of a switching network. The use of individual switching elements structured into a network results in an office which is very complex for any system of appreciable size. Furthermore, the whole approach of achieving central office function in this way encounters inherent problematic factors. The following paragraphs will discuss these factors.

Upon considering the relationship between the central control of a switching system and the switching network itself, a number of factors must be taken into account for both electro-mechanical and electronic systems.

DISTRIBUTION OF CONTROL SIGNALS a. The circuitry in an electro-mechanical system must distribute the control signals to the individual switching elements comprising the switching network.
b. The problem of spatial distribution of control signals is also true for electronic systems, although here it can be achieved with greater speed.

In both types of systems, electro-mechanical and electronic, substantial circuitry must be provided to distribute control signals to the switching network.

SENSING AND LOCATING FREE PATHWAYS-RETENTION OF PATHWAY INFORMATION

In any system utilizing a switching network, a connection pathway through this network must be formed in order to achieve a communications link between two telephones. This requires the control units to perform several functions:

1. checking to see if a given switching element is available for use,
2. constructing a pathway of free switching elements,
3. applying the necessary control signals to these switching elements to close the pathway and establish a communications link, and
4. retaining this information so as to free these particular elements upon the completion of a call and to aid in the determination of available pathways for other calls which might be initiated in the interim.

In electro-mechanical systems, this requires a substantial amount of equipment. Although electronic equipment performs these functions in a superior manner, the system must still incur substantial equipment requirements and the consequent cost in:

1. the necessary information storage equipment to retain the pathway information through the network;
2. the necessary information storage equipment to store the program instructions that achieve the complex processes of determining connection pathways through the switching network.

For electronic systems, the advantages gained by electronic circuitry are also partially compromised by requirements for adequate interfacing circuitry between the central processor and the switching network elements themselves. This problem arises in two areas:

1. interfacing the high-speed central processor equipment with the relatively slow speeds of electromechanical devices;
2. providing the necessary interfacing in regard to electrical parameters such as voltage, current, and impedance.

CONNECTION OF SPECIAL PURPOSE DEVICES DURING CALL PROCESSING

In the performance of standard telephone call processing, it is necessary to connect sensing, recording, and signaling devices to the line at various stages in the progress of a call. Sensing is primarily used to detect the on-off hook status of a given line. Recording must be accomplished when a subscriber dials the digits of the number he wishes to call, or uses a tone sequence to designate these digits. Signaling is provided at a number of points during the progress of a call such as the dial tone, a ringing signal, and a busy signal. Consequently, additional equipment is required to:

1. connect these special-purpose devises to an individual subscriber path. This equipment essentially consists of additional network circuitry to establish the required connection.
2. distribute the necessary control signals to the connecting network circuitry mentioned immediately above.

These circuitry requirements hold true for both electronic and electro-mechanical systems and are another demonstration of some of the inherent aspects of implementing a switching system using a spatially distributed network of individual elements.

RESULTANT COST-PERFORMANCE LIMITATIONS

Since the requirements of a large telephone office demand complex operations, the amount of equipment becomes great and consequently becomes expensive. Because of this, the design of any such system becomes a trade-off between cost and switching capability. The systems are designed to handle calls on a probabilistic demand basis in order to economize upon the massive amounts of equipment that would otherwise be needed to provide theoretical complete call handling capability. This type of compromise results in systems which:

1. must be continually monitored with respect to telephone traffic conditions. The results of the traffic monitoring studies must be acted upon and appropriate corrective actions must be taken to ensure that the system can provide satisfactory service at all times, including periods of peak load.
2. suffer from localized network blockage. This is a localized effect, resulting not from an overall high usage rate, but from a spurious concentration of subscriber line use in one physical area of the system, resulting in tie-ups in that area.

RELIABILITY PROBLEMS

Any system with a large number of components will suffer from random component malfunction to some extent. However, the electronic systems utilizing a central processor, must again pay for their performance advantages in terms of substantial duplicate equipment, since the failure of the main control unit would cause the entire system to be inoperative.

SYSTEM MAINTENANCE

Electro-mechanical systems require sufficient staffs of trained technical personnel to maintain them. This problem is made more difficult by the inherent complexity of large networks.

Electronic systems can overcome this to a significant degree by providing comprehensive diagnostic programs, but the advantage thus gained incurs costs resulting from the storage equipment needed for the necessary program instructions in the central processor memory.

SUMMARY

The above paragraphs have considered the major inherent problems encountered in space division type systems. These problems can be summarized as all stemming from the inherent aspects involved in implementing a switching system using a spatially differentiated network of switching elements. It is an object of this invention to substantially reduce the magnitude of these problems.

TIME DIVISION MULTIPLEX

The following is concerned with time division multiplex systems (abbreviated TDM). The class of time division systems encounters different problems due to the fact that it approaches the generic problem of constructing a telephone switching system from a completely different point of view. The time division system utilizes a "common highway" or "talking bus" along which all conversation travels when within the system itself. This type of approach can be used because it has been determined that the continuous throughput of a signal is not inherently necessary for the effective transmission of human voice signals. The signal need only be sampled on a repetitive bases. The pulse samples can be used to reconstruct the original waveform by appropriate equipment. Thusly, each subscriber signal is sampled, and assigned a time slot in the overall repetitive sampling sequence. In order for two subscribers to talk to one another, the control equipment simply assigns both telephones to the same time slot so that both signals are simultaneously gated into the "talking bus" and pulse-samples are transferred between these two gates for that particular time slot.

Time division systems, however, suffer from their own set of disadvantages. One of these is that time division systems require substantial equipment on a per-line basis as opposed to space division systems which can have commonly used equipment. The other key limitation of the time division system is the total number of subscribers that such a system can service; this number remains relatively small in comparison to space division systems on a competitive applications basis. The primary reason for this size-effectiveness limitation is that only a limited number of subscribers can be time-shared on a given "common highway." This number is 100 or less conversations, implying a possible 200 full access subscribers. The Bell System #101 ESS, has only 25 time slots per highway, allowing for 25 possible simultaneous conversations. Therefore, TDM systems due to the inherent aspects of their approach to the problem of switching, lend themselves to approximately several hundred line terminations, be these subscriber terminations or trunk line terminations.

Therefore, if it is desired to provide for a large number of subscribers using TDM techniques, then extensive provisions must be made for trunk line connections between the many small-sized TDM offices. But, this becomes prohibitive, in terms of equipment cost effectiveness. Consequently, TDM systems are employed as small PBX units which are interfaced with regular space division large central offices.

It is an object of this invention to improve upon the information handling capability of a switching system by utilizing time division multiplexing techniques but without the usual size limitations that are imposed upon such systems in the prior art.

In general, the system proposed in this invention will utilize both time division and space division techniques, but the resulting system will have advantages that neither of these approaches has realized on its own in the prior art. The advantages of this invention will become more apparent after a description of basic concepts of the invention itself.

DESCRIPTION OF THE PRIOR ART

This invention is believed to be basically unique in that switching is accomplished by selectively pointing a beam of radiation at sensors connected in the receiving line; the radiation being modulated with signal information. The prior art does show wireless switching by frequency selection at the central office and, in a very crude early embodiment, by physically moving a sound tube to connect two points to the audio signal. Neither approach is considered directly or closely pertinent to that described in this disclosure.

SUMMARY OF THE INVENTION

This invention is a switching system, and it specifically relates to the functions performed by a switching network such as those networks typified in a telephone central office system. In the central office format, the network function is to establish a number of simultaneous but independent communication links between specifically designated signal line terminations. The inter-connections between line terminations are established according to control information which has been entered into the system. This invention accomplishes the functions of a network by employing a selectively directed, modulated beam, the primary or preferred embodiments being implemented by:

1. transmitting the signals in the form of modulated light beams,
2. collimating said beams to achieve selective communication links,
3. directing the thusly collimated beams to specifically designated points according to input control information, and
4. detecting said light signals by photosensor devices with appropriate provisions for signal amplification.

Consequently, this invention functions as a switching network; but in total contrast to prior art which is in widespread use today, it is both wireless and switchless. The actual physical structure used to achieve this comprises:

1. a CRT with appropriate control circuitry for controlling both the deflection and intensity of the electron beam,
2. optical means for focusing the light generated by the CRT screen, and
3. an array of photosensors with each photosensor having provisions for amplifying any signal it might receive.

The light signals are generated and modulated by the CRT; are collimated by the focusing action of the optical system; and are directed to a specific photosensor by controlling the position of the CRT's electron beam.

From a systems viewpoint, the physical structure thus described functions as a multi-position switch that can direct a single input signal to one of a number of output signal flow paths. Additional circuitry is added to this basic structure so that the techniques of time division multiplexing can be used to enable the thusly augmented system to in effect transmit a number of signals simultaneously.

A further increase in system performance is attained by introducing the concept of a composite system in which a number of CRT's, each with its associated circuitry, are used with a common photosensor array. In this configuration means are provided to enable each CRT unit to function normally, despite the off-set position of any individual unit with respect to the photosensor array.

A device is also described which uses an electro-optical approach to achieve the function of time division multiplexing individual signals onto a common time-shared path. This device is considered for possible use in a time division multiplexed CRT unit, and is also considered for use as a line status sensing device in the specific application as part of a telephone switching system. The device is comprised of:

1. an array of modulated light sources and associated gating control circuitry
2. a converging lens
3. a photosensor and amplifier In the context of application of this invention as the switching network of a central office telephone switching system, additional means are provided for:

1. interfacing the switching device itself with both the supervisory control equipment, and the external lines and associated telephone equipment;
2. providing two-way communication between interconnected subscribers.

A description is given of the relationship of the switching device itself to the other major systems in the telephone central office such as:

1. the central supervisory control unit;
2. special purpose devices such as sensing, signaling, and recording units.

In this systems perspective, the function of the invention as a switching unit is described as part of the entire call processing functions of the telephone central office system.

BRIEF DESCRIPTION OF THE DRAWINGS

These and other objects, features, characteristics, and advantages of the invention will be apparent by consideration of the following description of the peferred embodiments, as illustrated by the accompanying drawings.

FIG. 2 illustrates a basic switching system also incorporating a time division multiplex feature.

FIG. 3 illustrates a composite system employing a plurality of CRT beams.

DESCRIPTION OF THE PREFERRED EMBODIMENTS

Statement Of Function— Basic Distributive Unit

The first functional unit to be described is a switching device which has as its input only a single signal flow path, and is capable of switching signals entering the system on this single input path to one of a number of output signal flow paths.

It should be noted that the restriction of a single input path is not made due to inherent necessity, but is chosen at this point for convenience of explanation of the invention by developing the concept of a basic functional unit.

The device to be described has a basic capability of transmitting audio frequency signals, and hence it has the capacity of being used in transmitting the human voice signals comprising a telephone conversation.

It should be noted, however, that the frequency response of the device is not limited to the audio frequency range, and higher frequency signals can be transmitted if so desired.

Description Of The System Elements

Figure 1:
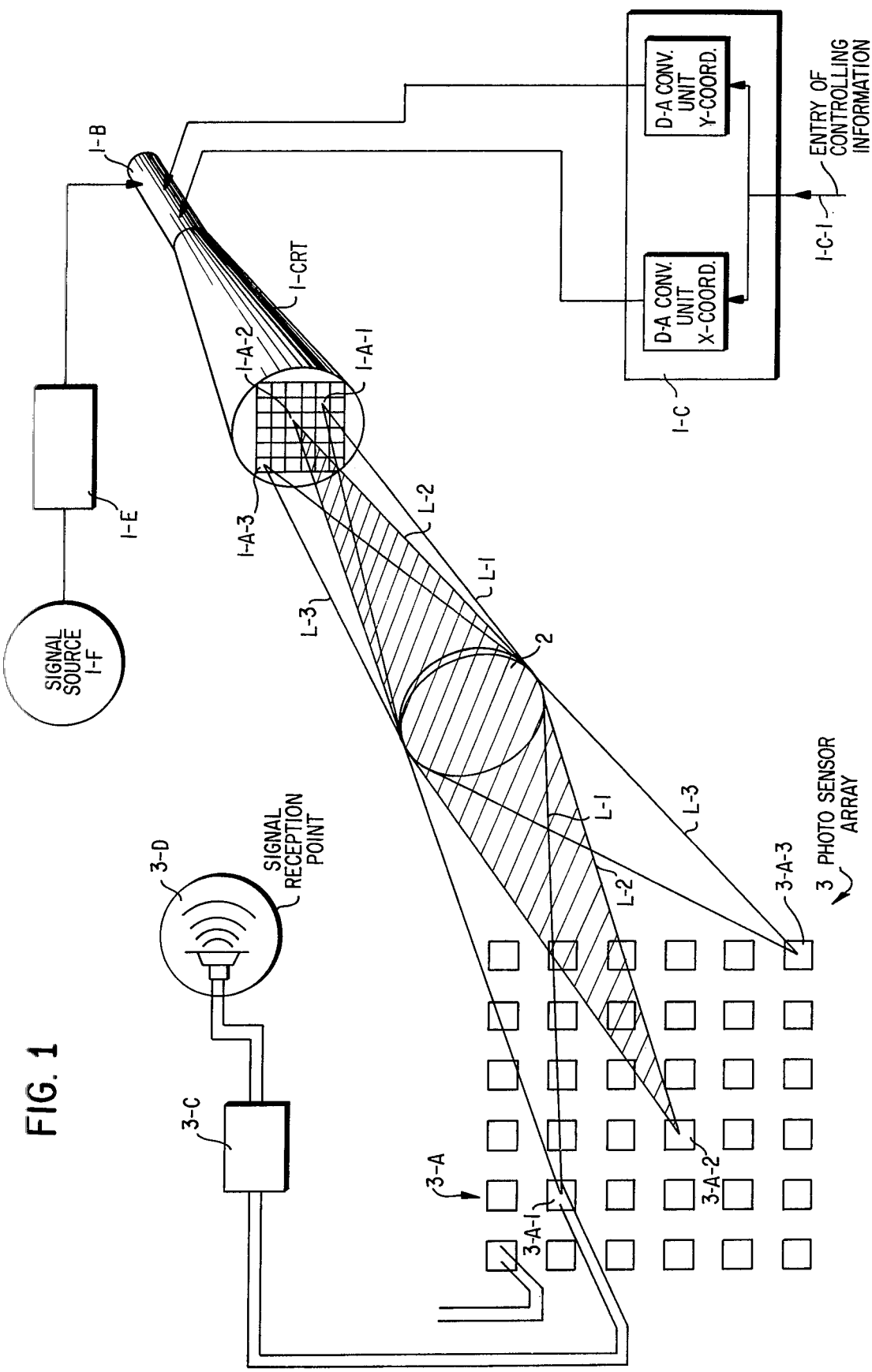
FIG. 1 illustrates the basic switching system, utilizing a single, conventional CRT.

As shown in FIG. 1, this device consists of three basic units:

1. A CRT 1
2. a lens or lens system 2
3. an array 3 of photosensors and an amplifier associated with each photosensor.

The lens is placed between the CRT 1 and the photosensor array 3, and the photosensor array 3 is positioned so that any light emitted from the screen of the CRT is focused on the array.

Integral to the CRT itself are:

1. a phosphor coated screen 1-A
2. an electron gun 1-B
3. means for modulating the intensity of the electron beam (z-axis control). This device is internal to the CRT itself and consequently is not otherwise shown.

The electron gun functions as both a source of electrons and a collimating device which forms the electrons into a narrow beam of particles.

Not shown in FIG. 1, but also conventional and basic to CRT operation are:

1. a power supply unit for producing the high voltage levels used to accelerate the electrons to the CRT screen, and for producing power for other CRT-associated units.

2. means for deflecting the electron beam such as electrostatic plates or magnetic coils.

Associated with the CRT as external equipment is the control unit 1-C which applies the proper voltage to the deflection apparatus thereby directing the electron beam in the desired manner.

In the photosensor array, the individual photosensor elements 3-A are drawn as small squares. In actual use the system would have an amplifier associated with each photosensor, but for the purposes of description only one amplifier 3-C is shown and is connected to the photosensor labeled 3-A-1. The individual photosensors 3-A in the array 3 are contiguous and closely packed so as to permit light beams to be selectively directed from one CRT to any particular photosensor in the array as may be desired.

Theory Of Operation

The functioning of this device comprises two basic aspects:
1. the transport of information from input to output;
2. the control (switching) of said information to a particular output signal flow path.

Transport

As shown in FIG. 1, a generalized signal source 1-F emits a signal which travels to a transuducing unit 1-E whereupon it is converted to a varying voltage in an electrical conductor. The signal is then applied to the z-axis input of the CRt and consequently becomes impressed upon the electron beam of the CRT as the intensity modulation of this beam by virtue of the action of the z-axis control unit. The electrons of the thusly modulated beam travel to the screen 1-A of the CRT where they cause the emission of light due to their action of striking the phosphor. This causes the screen target area to behave as a modulated light source since the electron beam itself is intensity modulated. Therefore, the signal which was emitted by the generic source 1-F has now become an intensity modulated light signal.

It should be noted that in order for the electron beam to successfully generate a light signal modulated at an audio frequency, the phosphor used must have a decay time which allows it to respond to audio frequency rates. A phophor, for example, such as the commonly designated as P-15, has the sufficiently short decay time and the required response for luminosity vs. electron beam current, as one who is skilled in the art will readily know.

The intensity modulated light signal emanating from the screen passes through the lens 2 and travels on to the photosensor array. (It is assumed that the light has been directed to strike a given photosensor rather than striking upon a vacant area in between individual photosensor elements in the array.) Upon striking a photosensor 3-A, the signal is detected by said photosensor 3-A, and is amplified whereupon it leaves the system to be used as desired. In FIG. 1 the amplifier is labeled 3-C, and the signal is shown driving a speaker 3-D.

Control

The essential object of control in this system is to be able to direct the input signal to a particular output signal path. In terms of the physical structure of the devices, this entails directing a signal at a specific chosen photosensor in the array. The ability to do so arises from a number of inter-related factors. Describing these factors is begun by considering the focusing action of the lens 2 which focuses any light emitted from the surface of the screen of the CRT 1 onto the surface occupied by the photosensor array 3. This means that the divergent light emanating from a specific point on the CRT screen is caused to converge on a corresponding specific point on the surface of the array. Thus, the lens solves the problem of selectivity, i.e., of confining the light signal which is essentially omnidirectional as it leaves the CRT screen so that it will strike a single photosensor and not a number of photosensors.

The focusing action of the lens, which action produces a specific point target area on the array for a specific point source on the CRT, holds true for any point on the CRT screen. This generates a one-to-one correspondence between points on the CRT screen and points on the surface of the array. Since the action of the electron beam striking the phosphor on the CRT screen generates what is essentially a point source of light, it can be seen that it is only necessary to control the beam target position on the screen in order to direct the resultant light signal to a particular spot on the photosensor array. The control of the beam target position is of course achieved by deflecting the beam, and this can be accomplished by employing the standard electrostatic or electro-magnetic techniques. As shown in FIG. 1, the representative points on the CRT screen labeled 1-A-1, 1-A-2, and 1-A-3, respectively, emit the diverging cones of light L-1, L-2, and L-3. These diverging signals propagate outward to the lens where they are focused by the lens and are shown on the other side of the lens 2 by the converging cones of light also labeled L-1, L-2, and L-3, respectively. These converging cones of light concentrate to respective points on the surface of the array itself which points are labeled 3-A-1, 3-A-2, and 3-A-3.

Therefore, any given photosensor in the array can be reached by applying the appropriate combination of horizontal and vertical deflecting voltages to the CRT. It can be further observed that the physical centers of the photosensor elements themselves, as target locations, would consequently be described by discrete control voltage levels as applied to the deflection circuitry of the CRT. It therefore becomes advantageous to structure the control information in digital form, and to convert this numeric information to specific voltage levels via a digital-to-analogue converter unit. In FIG. 1, the entry of digital information into the system is symbolized by the signal flow path 1-C-1, the input signal path of the deflection control elements 1-C. This digital information is split into two parts, one specifying vertical deflection, and the other specifying horizontal deflection. This is shown in FIG. 1, as the input signal flow path branches off left and right, sending information into two separate D-A converter units; one for horizontal (X) deflection, and the other for vertical (Y) deflection. Additional means must of course be provided to enter the information into the system. But inasmuch as such means could take on many forms and since the function itself is ancillary to the essential aspects of the invention, such means are noted here, but are not included in FIG. 1.

It should be further noted that in the use of this device a numbering format for the output signal flow paths must be constructed and adhered to in the operation of the unit. This is, of course, absolutely necessary if the invention is used as the switching network of a telephone central office. A numbering format consists essentially of assigning numbers to the output signal flow paths and ensuring that when the corresponding numbers are entered into the system as digital control information, the output signal flow path reached will in fact be the one with the same matching number.

In terms of the practical implemenation of this system, the following factors should also be considered.

1. Means should be provided to block and absorb light which is emitted from the CRT screen at an angle sharp enough to miss the lens. Failure to do so could possibly lead to unwanted signal reception by a photosensor.
2. Means should be provided to control and calibrate the deflection circuitry so that it can be adjusted and properly matched with the elements of the photosensor arrary.

Resultant System, Performance Characteristics

Therefoe, this system funtions as a multi-position switch, with which one can select a number of outputs by entering the digital control information to specify a particular output. The input signal is then switched to that selected output by the system. Of particular significance is the fact that the CRT structure thus far described can be used to select a very large number of outputs. For example, consider a system which can resolve 100 vertical and 100 horizontal positions. Note that for a 10 × 10 inches screen this is only one line per 1/10 inch which is far less stringent than the resolution capability of a common television receiver. However, such a system can specify 100 × 100 = 10,000 discrete positions. Therefore this system functions as a multi-position switch with an exceptional number of output positions.

Considerations Of Possible Alternate Embodiments

The system described herein uses an electro-optical approach to achieve the functions of a multi-position switch. In particular, it uses a CRT to direct the signal. The CRT is considered to be the preferred embodiment, but there are other possible approaches which do not use a CRT but which still use essential aspects of this invention. These are:

1. Digital light deflection techniques which use electro-optical properties of crystals to direct light beams. Dichroic cyrstals are arranged in an array and can be controlled so as to permit the passage of light from only a specifically designated crystal in the array. Therefore, this device functions in a manner analogous to the CRT screen which ca alter the position of the electron beam on the screen and thereby alter the position of the light source. When either structure is used in combination with a lens and a photosensor array in the manner described in the previous paragraphs, the same basic effect can be achieved.
2. An array of light emitting devices such as LED's. In this structure, a specific LED in the arry is activated, and is modulated by a signal to produce an intensity modulated light beam. Again, by specifying a specific LED in the emitting array, the position control action of the CRT screen point source is achieved, and this structure could be used to replace the CRT in the basic system.
3. A third possible approach, although much less feasible, would be to direct the light signal using an electro-mechanical device in which either a collimated source was itself aimed, or in which a fixed source was directed at some optical means (such as a moveable reflecting surface or refracting lens) which means could be controlled so as to direct the beam to the desired target.

The techniques using the crystals and the array of light sources, although they in-effect achieve the same type of result as the CRT, suffer severely in terms of comparative cost-performance characteristics with the CRT. This becomes evident when one considers that a CRT structure can very easily be used to direct signals to thousands of outputs. In the alternate proposals, components are required for each individual output path, and a comparable system would require thousands of components. The cost disadvantage of such a situation is such that the CRT is considered the preferred approach in relation to the state of the art as it now stands.

The third alternate proposal, that of electro-mechanical orientation, is also substantially inferior to the CRT on a cost performance basis.

In addition to these possible alternate structures, it should be realized that the term "light" should be considered to include other parts of the electro-magnetic spectrum than just the visible spectrum. For example, successful communication using optical techniques has been achieved using the infrared spectral range.

Multiplexed System

Introductory Statement

The basic system described in the previous section, despite a capability to switch a signal to a great number of output paths, can only transmit one signal at a time. The performance of such a system can be greatly enhanced by utilizing time-division multiplexing techniques so that the system could in effect handle a number of signals at the same time.

In accordance with this format, the electron-beam would be time-shared among a number of photosensors, sending to each a burst of light resulting from a short duration time sample of an individual signal. Consequently, each photosensor which was receiving a signal would receive that signal as a series of pulses which would be amplified and filtered to re-construct the original continuous waveform.

TDM Techniques Review Summary

The principles of time division multiplexing have been well developed as one who is skilled in the art would know. However, a brief review of the basic concepts and process involved is presented in the following paragraphs:

In the first part of the process, a group of individual signal flow paths are scanned on a repetitive basis, so that a short duration time sample is taken of the amplitude of each signal. These individual pulse samples are placed on a common signal flow path so that the resultant signal traveling on this path consists of a series of pulses which are interleaved samples of the individual signals. This transformation of a group of separate signals into a train of pulses on a single signal flow path essentially constitutes the multiplexing process.

The following terminology is used to dscribe some of the basic aspects of this process:

1. time frame or time base — the time it takes to scan all the signals in the group.

2. time slot — the particular position occupied by a given pulse sample in the recurrent sampling processes.
3. PAM TDM-since the above process described transmitting a pulse amplitude sample of the individual signals, the resultant process is called Pulse Amplitude Modulation Time Division Multiplexing, abbreviated PAM TDM.

Note also that the time between recurrent pulse samples of any individual signal is the same time duration as the time frame.

In order for signal waveforms to be successfully reconstructed from the recurrent pulse samples, the sampling rate must be sufficiently rapid. Communications theory, which has been supported in practice, has determined that the sampling rate must be at least twice the frequency of the highest significant frequency component in the signal to be sampled. For human speech, this is commonly set at 4 KHZ thereby implying a sampling rate of 8 KHZ or a resultant time frame of 125 microseconds or shorter.

The next stage in the process is, of course, de-multiplexing which is essentially a reversal of the multiplexing process. As the individual pulse samples enter the multiplexing units, each of them is directed to a particular output signal flow path according to the switching information applied to the de-multiplexing unit for each time slot. Therefore, just as individual signal samples enter the system on a repetitive basis, a specific control signal for each individual pulse must be provided for by the de-multiplexing unit. Therefore, a group of control signals must also be repetitively scanned and applied to the de-multiplexing unit at the precise moment that corresponds to the signal pulse associated with them. The result is that there must be synchronization between the entry of individual pulses and the control signals applied. Since the pulse samples are themselves generated by the scanning process, synchronization can be accomplished by synchronizing the scanning circuitry with the control signal selection process in the de-multiplexing unit. As each PAM TDM pulse is switched to a particular output signal flow path, any given output path itself receives a series of pulses which are 125 microseconds or less apart. These pulse samples are then sent through appropriate filtering circuitry and are amplified, thereby reconstructing the original signal waveform. This completes the TDM process.

Description of the Multiplexing Unit

FIG. 2 shows a system comprising three main parts:
1. a multiplexing unit
2. a basic distributive type CRT system which here also functions as a de-multiplexing unit
3. supervisory control circuitry and common timing circuitry The multiplexing unit is shown having separate input signal flow paths. The signals traveling on these input paths are admitted by gates 10, which control each line. The gates themselves are controlled by a gate control network which is shown in block diagram form. This network is essentially a unit which receives binary input information, and decodes this information into a ONE of N output form, thereby activating a single gate for any particular binary input. The binary input information itself is supplied by a binary counter which is driven by a continuous series of clock pulses from the master clock unit. The result of this configuration is that the individual input signals are periodically and repetitively scanned since the repeated reception of clock pulses changes the state of the counter which in turn causes the network to activate a different gate. After a given number of clock pulses has been received, the counter automatically resets, and the process starts over again.

In FIG. 2, the graphic insert GS-1 shows the continuous waveform of an input signal. When any signal is admitted by a gate, the signal is transferred to a common signal bus where it leaves the multiplexing unit in PAM TDM form as shown by GS-2. The multiplex action of transferral to the common signal path is symbolized by the "V" lying on its side with the output signal flow path at its apex.

Description of the De-multiplexing Unit

The de-multiplexing unit comprises two major parts:

1. a basic distributive unit comprising a CRT, a lens, a photosensor array, the D-A control circuitry associated with the CRT. This is the same basic unit that was described in the previous sections.
2. additional external control circuitry comprising:

1. a storage unit with output, input, and address select registers, and control inputs for READ and WRITE operations;
    2. a supervisory control unit;
    3. the master clock unit.

The de-multiplexing action is achieved by using the storage unit to feed specific control information to the CRT deflection control circuitry for each time slot in the unit time frame. This is done by driving the storage unit through a repetitive basic cycle of operation. That cycle consists of:
1. transferring the information contained in the binary counter to the address-select register of the storage unit;
2. giving a READ command to the storage unit which results in the transferral of the information contained in the address selected to the data output register of the storage unit
3. the information in the data output register of the storage unit is used by the CRT to direct the electron beam to a specific screen target position and consequently to a specific photosensor;
4. in the interim, another clock pulse has been received by the counter, thereby changing its state.

The cycle then starts over with the new counter contents being transferred to the address select register. The proper control signals which also have to be properly timed to effect this cycle are generated by the supervisory control unit which uses the master clock unit as a time reference base. The result of the repetitive READ cycle is that each storage location is sequentially accessed (the storage unit is in effect scanned) and the contents of each location are used as control information by the CRT. Recall, however, that the same binary counter information is also used to select an input signal for the multiplexing unit. Therefore, there is a fixed correspondence between the input signal flow path sampled in the multiplexing process, and the specific address that is selected in the storage unit, the contents of which are fed into the CRT deflection control circuitry. Therefore, for every time slot in the multiplexing time frame, there is also a specific control signal applied to the CRT deflection circuitry for that corresponding time slot by virtue of the correspondence between the address location selection and the input signal flow path selection.

The result of this is that when a given pulse sample on the PAM TDM path enters the CRT z-axis input and thereby modulates the electron beam, that portion of the modulated beam is directed to a particular screen target position (and corresponding photosensor) each time that particular time slot comes up. This holds true for all time slots in the time frame. The specific photosensor selected of course depends upon the address contents which are present for that particular time slot.

From the standpoint of a given photosensor which is receiving a signal, the multiplexing/de-multiplexing process described above results in the photosensor receiving a series of pulses, one pulse for each time frame. The series of pulses is illustrated generally in FIG. 2 by the graphic insert GS-3. These pulses are filtered and amplified by the circuitry associated with each photosensor, and the resultant re-assembled waveform leaves the system as shown in GS-4.

Consideration must also be given to the entering of information into the storage unit, and appropriate means have been provided to accomplish this. The process itself begins by placing the data to be stored in the data input register of the storage unit. Information which specifies the desired location is entered into the address select register of the storage unit. Then a WRITE command is given to the storage unit itself. It can be seen, therefore, that entering information into the storage unit comprises a WRITE cycle, and the appropriate control signals are generated by the supervisory control unit as was done for the READ cycle. Additional consideration, however, must be given to the fact that the WRITE cycle requires a certain amount of time. During this time, the storage unit cannot perform a READ operation, an hence there is a time-usage conflict of storage unit operations with respect to requirements for the multiplexing process. This problem can be resolved, however, simply by reserving a particular time slot for writing new information into the storage unit. Under such conditions, the supervisory control unit would NOT transfer binary counter information into the address select register, but would use information from another source which contained the desired address information, and the WRITE cycle would proceed normally.

Other Considerations

The preceding paragraphs have described the basic operation of a multiplexed unit, however, there are some additional facts that warrant attention. The first of these is an observation concerning system capability; namely that the system thus described can switch any given signal to a number of outputs which is far in excess of the number of signals that are transmitted through the system on a time-sharing basis. For example, let us say that the system can multiplex 50 signals. However, each of those signals could be directed to any one of several thousand photosensors in the array. Provisions simply have to be made to have enough bits in each storage location to specify completely all of the photosensor positions.

Another possibility is that of having the multiplexing unit select input lines in the same way that the demultiplexing unit selects control information, by accessing the contents of a storage unit. This would allow for the non-sequential access of input lines.

There are two major ways in which this capability can be used to advantage:

1. A large number of input lines can be served on a probabilistic demand basis, with the supervisory control circuitry maintaining request and acquisition status. Although such a system could lead to trafficing problems as manifested in prior art, the possibility of constructing such a system is nonetheless given to the designer if conditions deem it worthwhile.
2. By non-sequential selection of input paths, a format could be arranged which selected addresses in the storage unit associated with the CRT so that the electron beam swept the screen in a uniform manner. This would increase the CRT's effective response and would allow for a given piece of equipment to handle a greater number of multiplexed signals.

The generic technique, mentioned immediately above in subparagraph 2, of utilizing an additional storage system in conjunction with the multiplexing part of the system is considered to be of particular potential, and a more detailed description of the operation of that system is indicated in order to obtain a precise and complete understanding of its operation. In regard to this, it is observed that in the multiplexing-switching process shown in FIG. 2 there are three distinct factors present:

1. the identity of any given line being sampled
2. the uniqueness of each given time slot in the multiplexing process
3. the fact that the destination of any given pulse sample is determined by the switching information which deflects the beam for the time slot in which that pulse sample appears.

Note that in FIG. 2, it is the state of the counter which effectively designates what time slot the system is in, and since the counter directly drives the gating network, there is a direct and fixed correspondence between the time slot number and the number of the line being sampled. Since, of course, the counter also drives the address select of the storage unit, and the contents of each address determines the beam deflection, the correspondence between any given time slot and the destination of any given pulse sample for that time slot is achieved. But note that in order to achieve the desired switching of a given pulse sample, it is the time slot correspondence between that pulse sample and the appropriate switching information for it that is important. This means that the time slot to which a given line is assigned is actually arbitrary as long as the proper deflection information is provided for it. This fact attains importance when it is realized that in order for the system shown in FIG. 2 to work properly for all possible inputs of switching information, the beam deflection circuitry must be able to make the beam traverse nearly the entire area of deflection (because the next target position could be anywhere in that area), and it must be able to do so in the time space between the pulse samples of the multiplexing process. Otherwise, the beam will not have reached its required target position in its required time. This places a strong performance requirement on the beam deflection circuitry, and shows that one limitation of the number of lines that can be multiplexed by the system is the full target-screen-dimension response of the deflection circuitry.

Figure 2C:
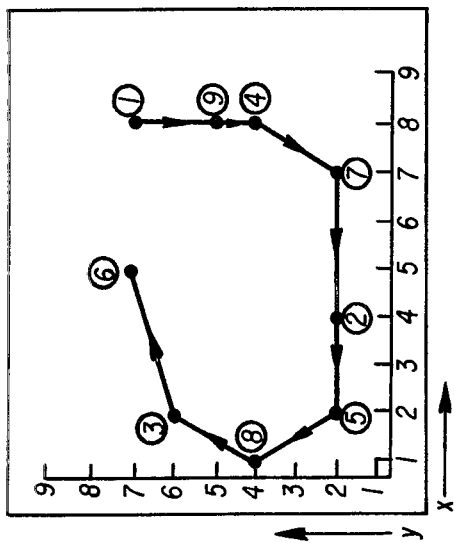
FIGS. 2B and 2C show illustrative diagrams and data charts describing the performance the systems of FIG. 2 and FIG. 2A, respectively.
Figure 2B:
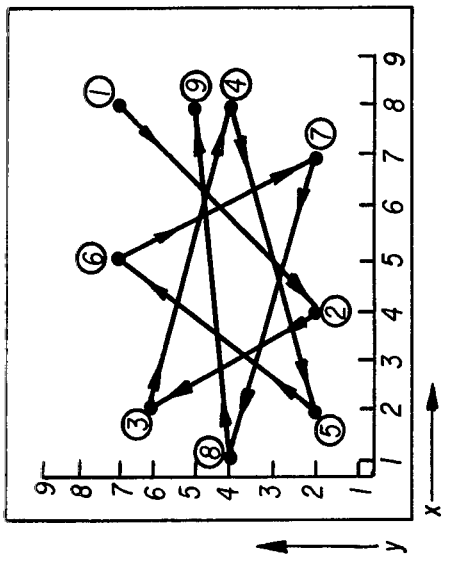

FIG. 2B shows a CRT screen and the resulting beam trace for 9 lines with the switching information for that trace shown in the data chart immediately below. In FIGS. 2B and 2C the arrow heads indicate the direction of beam traverse and each circled number indicates the number of a line switched to at that beam position. Note the distance the beam must travel between successive target positions. The reason for this is that the beam must respond to whatever switching information it is given, and the order in which the pulse samples are switched is fixed. The pattern depends on chance as to which target is assigned to which time slot. The beam trace pattern is essentially random or quasi-random.

Figure 2A:
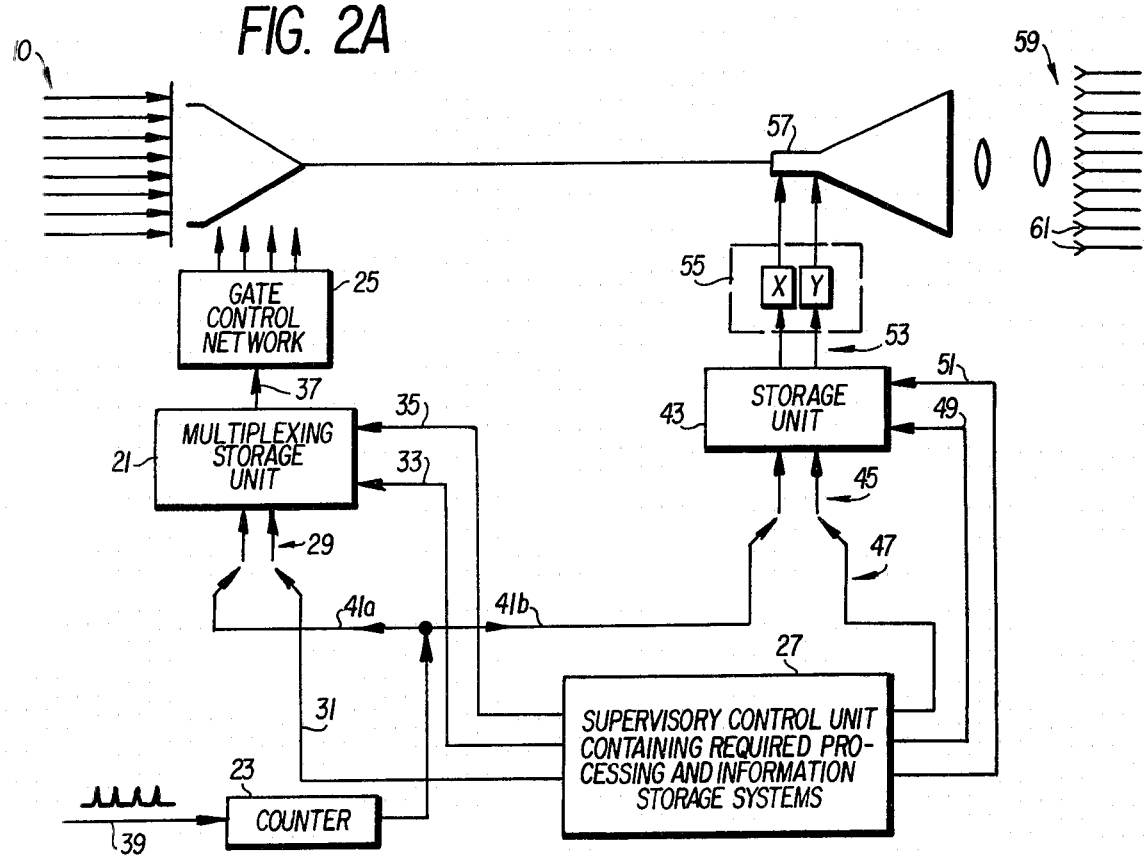
FIG. 2A shows an improvement on the basic system shown in FIG. 2.

The system shown in FIG. 2A overcomes this problem, and the resultant beam switching path of the system shown in FIG. 2A for the same switching information is shown in FIG. 2C. In the FIG. 2C pattern, the next target assigned in succeeding time slots is the one closest to the previous target, and to the next target in the sequence. Upon comparing traces of FIG. 2B and FIG. 2C, the substantial reduction in trace length provided by the FIG. 2A embodiment is immediately evident.

This is accomplished by the system shown in FIG. 2A via the additional storage unit 21 placed between the counter 23 and the gating network 25, and by the information processing of the supervisory control unit 27. Address information from the supervisory unit 27 is applied to the address select inputs 29 of multiplexing storage unit 21 by line 31. Inputs for read/write command and for address input control are applied from supervisory unit 27 to multiplexing storage unit 21 through line 33. Line number data is applied from supervisory unit 27 to multiplexing storage unit 21 through line 35. Line 37 transmits output data from storage unit 21 to gating network 25.

Counter 23 receives clock pulse count inputs on line 39. The output of counter 23 is connected to multiplex storage unit 21 by line 41a, through input 29 and to switching storage unit 43 by line 41b through address select inputs 45. Address information from the supervisory unit 27 is applied to the address select inputs 45 of storage unit 43 by line 47. Inputs for read/write command and for address input control are applied from supervisory unit 27 to switching storage unit 43 through line 49. Switching conrol data from supervisory unit 27 is applied to storage unit 43 through line 51.

Output data from storage unit 43 is applied through lines 53 to the deflection circuitry 55, which accomplishes digital to analogue conversion, followed by deflection of the beam of the CRT 57 to the selected target in the array 59 of sensors 61, each connected with an individual receiving line.

General operation for the system of FIG. 2A is the same as described with respect to FIG. 2. The information processing that the supervisory control unit 27 in the FIG. 2A embodiment performs is simply that of inspecting the switching data already in the system, and of re-allocating the line pulse samples with regard to their time slot assignments so as to reduce the length of the trace-path of the CRT beam while retaining the proper switching destination of the pulse samples in the course of the re-allocation procedure. The supervisory control unit achieves the re-allocation by writing the number of the line to be sampled in the proper address of the multiplexing storage unit 21. This would entail sending the appropriate time-slot information to the storage unit 21 over the input line 31, sending the appropriate number of the sampled line over signal flow path 35, and sending the WRITE command over line 33. But recall that the address selection of this storage unit is directly driven by the counter 23, and the counter state directly corresponds to the time slot number. Therefore, in order to assign a given line to a given time slot, the number of that line is simply written in the address of the multiplexing storage unit 21 corresponding to the desired time slot. The retention of the proper switching information for any such re-assigned pulse sample is achieved by writing the switching information for that pulse in the identical corresponding address of the switching storage unit 43, which unit of course, has its address selection driven by the same binary counter 23 that drives the multiplexing storage unit 21. This would entail sending the appropriate time slot information to the storage unit 43 over line 47, sending the switching data over line 51 and sending a WRITE command over line 49.

The embodiment of FIG. 2A thus achieves the reallocation of the order of target sweep from a random or quasi-random one to one of sweep pattern under the control of unit 27. This can be seen by inspecting FIG. 2A, and the comparative numeric re-assignments can be seen by inspecting the respective charts in FIGS. 2B and 2C. The comparative results of this numeric change are of course shown on the respective CRT screen diagrams, as mentioned earlier.

The precise method which is used by the supervisory control unit 27 to determine what lines will be assigned to what specific times slots can vary as long as it produces an adequate reduction in the beam switching path. As an example of the basic approach to this process, the re-allocation of FIG. 2A was obtained by picking an arbitrary starting point, line 1 in this case, placing it in the 1st time slot, then looking for the line with the target position closest to line one's target position, line 9 in this case, and placing it in the next time slot. The line closest to line nine's target position, (of the remaining lines) is sought next, and similarly placed in the next time slot. This procedure is repeated until all the new time slot assignments have been determined. This type of process suggests, of course, the use of a computer within the supervisory control unit 27, where the computer is programmed to optimize the beam switching path. Both fundamental and more sophisticated programs can be written, depending upon what is desired in any given situation.

Figure 3A:
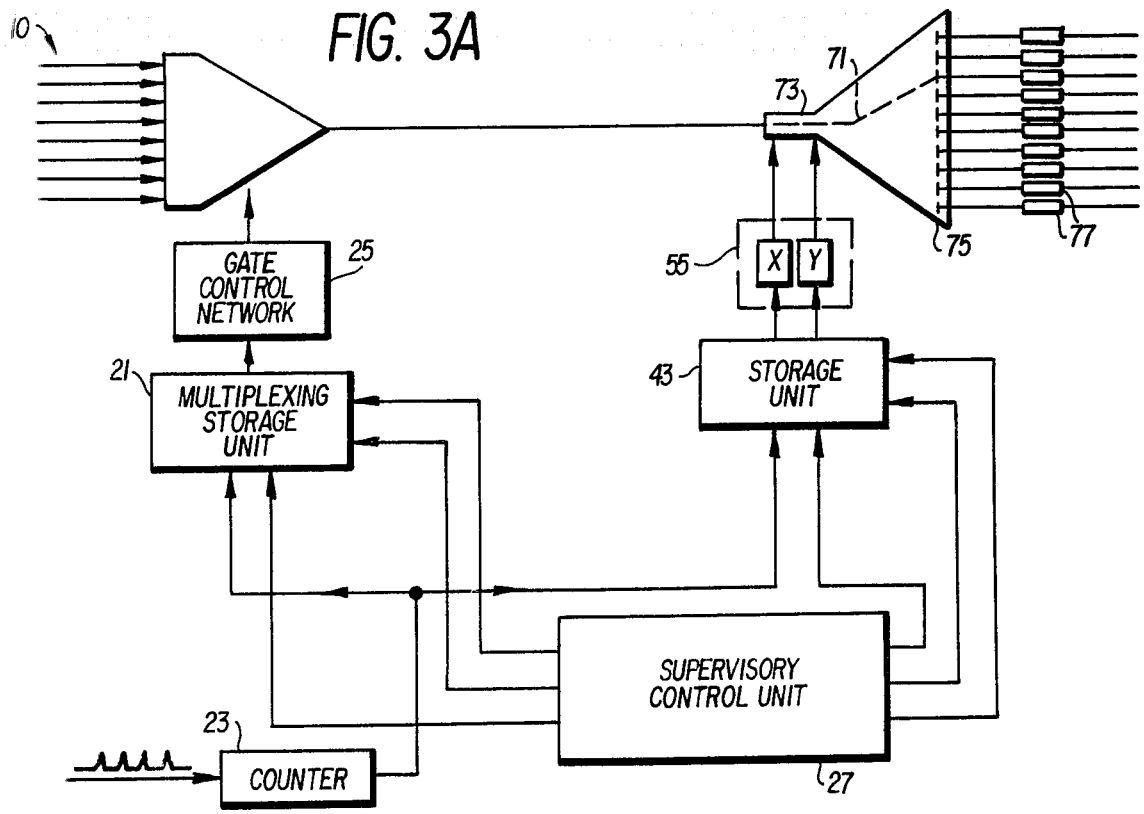
FIG. 3A illustrates an alternative embodiment using sensors responsive to electron radiation employed in a TDM single CRT configuration with the re-allocation circuitry of FIG. 2A.
Figure 3B:
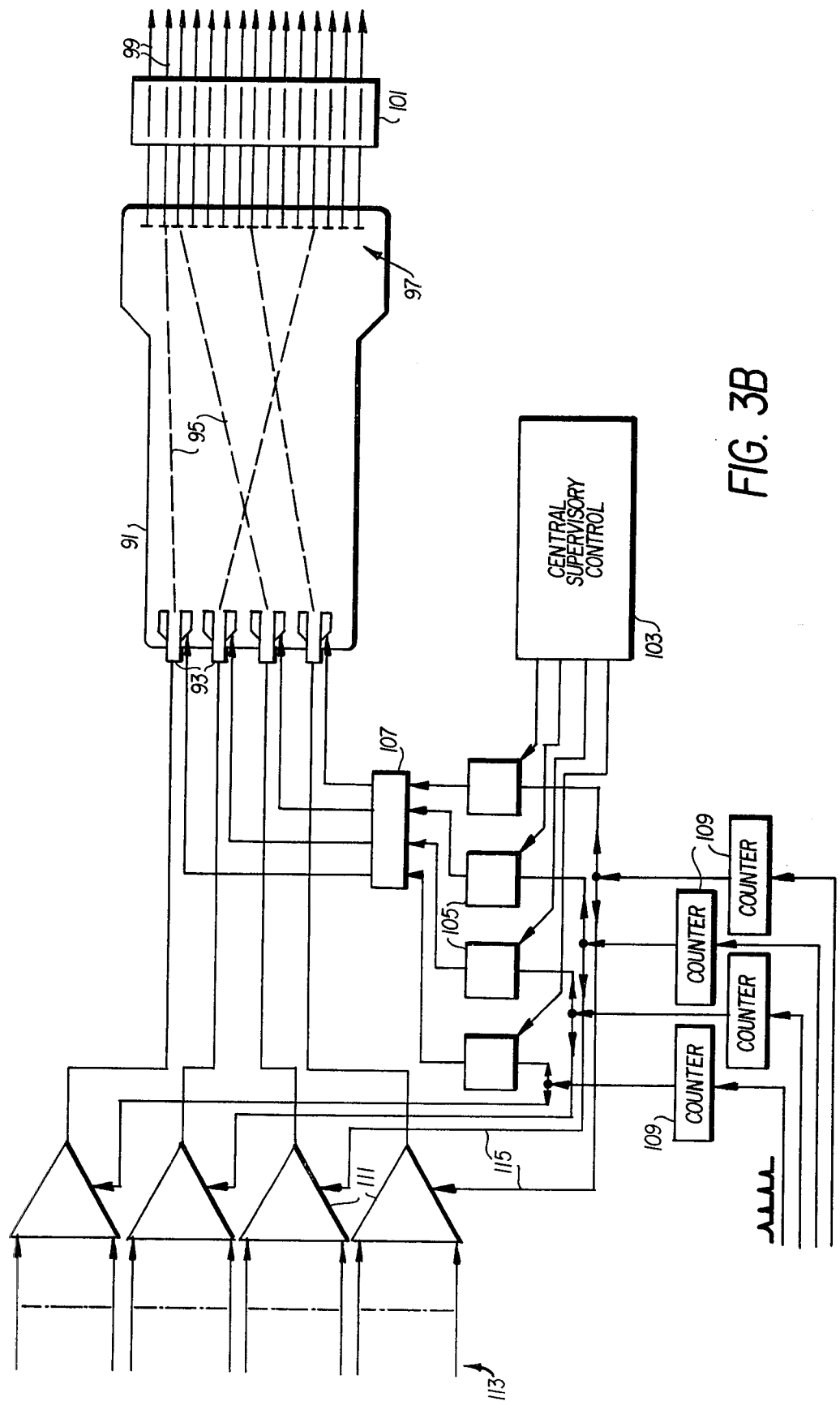
FIG. 3B illustrates an alternative embodiment of a composite system using sensors responsive to electron radiation with a multiple beam CRT.

While the embodiment is illustrated with the preferred optical embodiment, the concepts of re-allocation are directly applicable to the electronic embodiment of FIGS. 3A and 3B.

Composite System

Introductory Statement

The basic distributive unit comprising a CRT and associated control circuitry, a lens, and a photosensor array with amplifying units was improved upon by additional means for time division multiplexing. This resulted in a significant increase in signal throughput capability with a relatively small increase in additional circuitry. But to this point all the systems that have been described have used a single CRT with a photosensor array. Nothing limits the situation to this case, and therefore a composite system can be constructed in which a number of CRT's use a common photosensor array.

Such a composite system is shown in FIG. 3. In this diagram four CRT's are shown to share a photosensor array. Each of the CRT's has its own lens system. Also each CRT has its own multiplexing and control circuitry.

Additional Means: Requirements and Explanation

The only additional requirement of such a system arises from the fact that the CRT's are offset from the center of the photosensor array. Therefore, means must be provided to compensate for this. Two factors should be ensured for each CRT:

1. that each CRT is capable of directing signals to all photosensors in the array, regardless of its own offset position;
2. that control information for the CRT is uniform, i.e., when the same digital information is sent to any CRT it will result in a signal being sent to the same photosensor regardless of the off-center position of the CRT.

Generically, any optical means can be contrived to accomplish proper CRT positional compensation. A specific suggested technique will be presented here and explained. The essence of this approach lies in giving each CRT and its associated lens system, the capability of directing a light beam over an area greater than the size of the photosensor array. This is done by having the lens magnify the effective image produced by the perimeter of the CRT screen to a size greater than the photosensor array, but retaining the focal plane of the projection in the plane of the array. Therefore, with such a lens system, a centered CRT would only have to use the mid-portion of its screen in order to be able to reach all of the photosensors in the array. If this same CRT were then positioned off center, this is compensated by repositioning the middle of the screen area actually scanned by the electron beam off to one side or up or down as required. Such repositioning of the scanned area is readily accomplished by the beam centering controls which given the beam starting point a specified amount of horizontal and vertical deflection without any control signal present. Therefore, when a given CRT is offset from the photosensor array, one simply compensates by properly adjusting the beam centering controls.

Other possible optical arrangements could be used such as arranging the CRT's in a semi-circle and directing their light signals radially inward where optical means would have them all emanate from a common point centered on the photosensor array.

System Capability

In terms of signal transmission and signal switching capability, the composite system represents a significant degree of performance. The constructions previously described in this presentation serve as a base for comparison. The basic distributive system functioned as a multi-position switch with a single input. For example, consider such a switch to have 625 output signal flow paths (a 25×25 array). Thus the system can transmit a single signal and can switch that signal to one of 625 outputs.

If this same basic system is then equipped with the appropriate multiplexing components it can handle a number of signals at one time. Let us consider the multiplexed system to be capable of handling 50 signals. Therefore the system has retained its output paths at 625, but has increased the number of signals transmitted through the system to 50, and has maintained full switching capability for each of these 50 signals in that they can all be directed to any one of the 625 output paths.

A composite system would further increase the number of simultaneous signals capable of being transmitted through the system, and still retain full switching capability for each of these signals. For example, let us consider using 10 multiplexed CRT units each of them with a capability of transmitting 50 multiplexed signals. Therefore the system has a capacity of transmitting $10 \times 50 = 500$ simultaneous signals. But again, it has maintained full switching capability in that any one of these 500 signals can be switched to any one of the 625 output signal flow paths.

There are several key factors that can be observed in the case of the composite system:

1. the ability of each signal to be switched to any one of the output signal flow paths;
2. the ability to use individual multiplexed CRT's as modular units in the composite structure without any consideration for interfacing circuitry. The only provisions that have to be made are for the lateral displacement capabilities of the individual units, and for compensation of digital switching information due to differences in physical relationship to the photosensor array;
3. the ability to use CRT's as independent structures within the context of a composite system leads to tremendous versatility in system construction both as to desired system size, and to altering the size of an already existing system.

In addition to the above listed performance capabilities, a composite system with enough individual units has as many input paths as output paths, and the whole nature of the structure takes on a different perspective, that of a system which has a number of input and output paths, rather than just a group of individual input signals.

Alternate Embodiments

With the description above of the basic distributive system, several alternate embodiments to the CRT were mentioned, such as:

1. dichroic crystals to provide digital light deflection;
2. an LED array;
3. electromechanical techniques Similarly within the concept of the composite structure, there are several alternatives other than the separate CRT unit positioned with other units on a common photosensor array. Among these are:

1. CRT's with multiple electron guns within the physical structure of the tube.
2. Variation encompassed by the concept of a large evacuated enclosure which contains all of the electron guns and employs one large screen.

Furthermore, utilizing the fact that the electron beam of the CRT itself is a directed beam, the array of sensors can be placed internal to the envelope of the CRT itself, and electron sensitive sensors can be used to detect the beam directly as shown in FIG. 3A. FIG. 3A is a single cathode ray tube configuration with the time division multiplexing and re-allocation circuitry of FIG. 2A.

The deflection control circuitry 55 controls the single electron beam of cathode ray tube 71. The sensor array 75, with each sensor connected to an individual receive line through amplifier units 77, is located within the evacuated envelope of the CRT 73. Other structure and operation of CRT 71 is essentially conventional. The sensor areas of array 75 are conductive areas upon which the cathode ray or beam 71 is trained.

Thus, operation of the embodiment is essentially as described with respect to FIG. 1, in general, and FIG. 2B with respect to multiplexing and re-allocation of the sweep pattern. Instead of the face of the CRT generating light, which is received by a photosensor connected to a receive line, sensors associated with the receive line are located with the envelope at the CRT.

The embodiment of FIG. 3A, however, would tend to be unwieldy for use in a composite system of more than one CRT since the individual lines are separated internal to the CRT and would have to be connected externally. Furthermore, tieing together sensor leads from a number of CRT's to a common amplifier unit would present potential noise and extraneous signal pickup problems related to the physical length of the leads.

A configuration which would be much more suitable for use in a composite system is shown in FIG. 3B. Here the variation of multiple electron beams within a single CRT envelope, where the individual beams are all aligned to be directed at a common target area, is combined with the alternative of using sensors responsive to electron radiation.

The system of FIG. 3B comprises a single CRT 91, having a plurality of electron beam guns and deflection units 93, each providing an individually controlled electron beam 95. Within the evacuated CRT 91, is an array 97 of sensors responsive to the electron beams 95 and to which any one of the beams 95 can be directed.

An individual output line 99 is connected to individual sensors of array 97. Outside CRT 91 is a separate amplifying and filter unit for each line shown collectively as unit 101.

The system has time division multiplexing as described in foregoing embodiments. Accordingly, the system has a central supervisory control 103, switching information storage units 105, deflection control circuitry 107, counters 109, which advance on clock pulses, and multiplexing gating units 111. Signals come into the system on lines 113. Gating information is applied on lines 115.

Essential operation is as described with respect to FIG. 3A. In this embodiment, each electron beam 95 may be directed to any sensor in the array 97.

Ultimately, the composite system may consist of a structure using any combination of the above listed physical embodiments as the nature of the situation requires.

Electro-Optical Multiplexing Unit

Introductory Statement

In order to increase the signal handling capability of the basic distributive unit, time division multiplexing techniques were used. In this context, a generic description of a multiplexing unit was given. It is the purpose of this section to propose an electro-optical version of a multiplexing unit rather than the devices existing in the prior art which use an electrical conductor as a common path.

Basic Description

Figure 4:
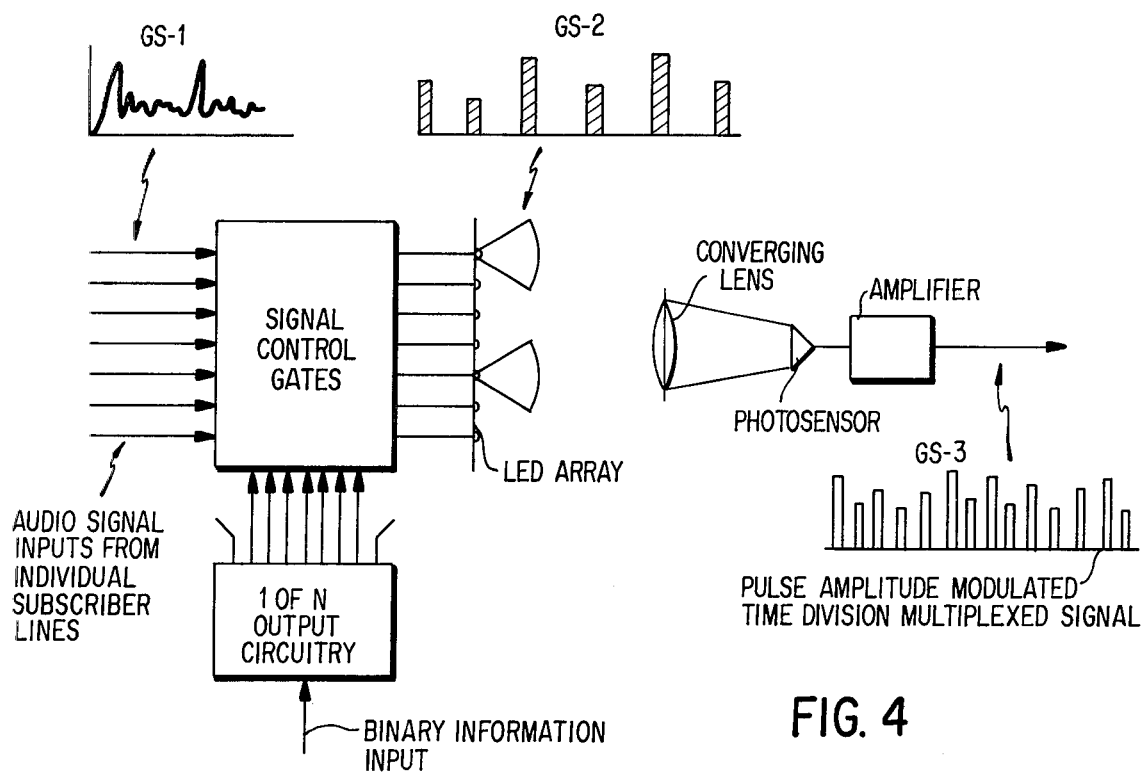
FIG. 4 illustrates a system employing an array of light emitting diodes as optical generators to function as a multiplexing unit with appropriate supportive gating circuitry.

As shown in FIG. 4, this device is composed of 1. an array of modulated light sources (LED's in this case) and associated gating control circuitry;
2. a focusing lens;
3. a photosensor and amplifier, The components of this device are so aligned that light emitted from any one of the LED's in the array will be directed to the photosensor.

The control circuitry associated with the LED array is shown in block diagram form. Each LED is modulated by a signal which enters the system on the signal flow paths labeled "audio signal inputs." Conversely, every such signal flow path entering the system has a LED as a terminating point. Each one of the input paths also has a gate in series with the LED. The purpose of the gate is to either block or admit the input signal to the LED. This situation is symbolized by the block labeled "signal control gates." The gates themselves are controlled by control signals which are supplied by the block labeled "1 of N output circuitry." This block is essentially a network which decodes a binary coded input and has as an output N signal flow paths of which only one is activated for any given binary input. Consequently, for any given binary control input, the system will allow only one signal to modulate its particular LED.

Description of Operation

The unit will first be described as operating in the multiplexing mode, in which it functions as the multiplexing unit of a TDM multiplexing-demultiplexing pair. In this mode of operation, the timing circuitry sends a series of binary coded inputs to the 1 of N output circuitry, thereby causing each gate periodically and repetitively to admit any signal which might be present, to the LED of that respective path. The succession of binary control inputs generates a scanning effect as each input signal is allowed to modulate its particular LED for a short time duration. The result is that each LED emits a pulse of light of an intensity proportional to the amplitude of the signal for that short time period. Thusly, the operation is in accordance with the principles of TDM and the resultant sampled waveform is shown in GS-2 in comparison to the continuous waveform shown in GS-1.

The light emitted from each LED passes through a converging lens where it is focused on a photosensor. It is detected by the photosensor, amplified and sent out on the PAM TDM path.

Due to the fact that light emitted by any one of the LED's in the array will be focused on the photosensor, as each signal is gated to an LED, any resultant pulse will be detected by the photosensor and a series of interleaved signal pulse samples will be produced on the common TDM path as shown by GS-3. Therefore, the device functions as a multiplexing unit.

It is also possible to have the device function in an alternate mode of operation by using somewhat different control circuitry. Instead of using a binary counter as the control signal input, a storage unit could be used. In this format, the storage locations would be sequentially accessed by the timing-control circuitry, and the contents of each storage location would be used as the control input information. This would permit non-sequential sampling of the input signals as was mentioned above in the description of the use of multiplexing devices with the basic distributive unit.

If circumstances required, it would also be possible for the device to transmit a single continuous signal, by maintaining a single binary control input for an extended duration of time.

The advantages of using an electro-optical multiplexing device result from:

1. the dual function that such a device can perform as both a line status sensing device and multiplexing device (applicable where used as a part of a telephone switching system);
2. excellent electrical isolation of the individual signal flow paths due to the optical transmission of information.

This unit can be used as a sensing device by:
1. constructing the individual subscriber line input circuitry so that the lifting off-hook of a subscriber telephone resuls in sending a DC-level quiescent signal to the LED;
2. providing a DC amplifier for use with the photosensor, and a DC level threshhold detector attached to the PAM TDM signal flow path.

Therefore, as the timing-control circuitry scans the input signal line and sends multiplexed signal samples into the system, the threshold level of these signals could also be detected indicating an on or off-hook status. Significant component economies are thereby achieved because of the resultant dual function of the device. Even in the more sophisticated ESS system, the ferrod sensing elements must be driven by a separate scanning unit, and also must be disengaged from the talking line by a relay because they would otherwise shunt the talking signal.

Since the individual input paths are electrically isolated from the common TDM path by virtue of the optical transmission of the signals, the system is free from many potential problems inherent in a system using a direct-contact electrical conductor as a common signal bus.

It should be pointed out that the LED is considered as the preferred component to be used in such configuration due to:

1. its long term operating life;
2. its linear charactistics of intensity with respect to input current and the consequent suitability as a modulated light source;
3. the high frequency response of the LED which enables such devices to be used effectively as part of an array which is scanned at a high rate.

It should be recognized, however, that the LED is not the sole type of component that could conceivably be used in this device, and that other devices could also function in this configuration.

It should also be noted that the term "light" should be considered in its broadest sense, so as to include other ranges of the electro-magnetic spectrum than just visible light.

Telephone Central Office System

Introductory Statement

The description of the electro-optical switching system has been generic in that it did not describe the invention as being used in any particular context of application. It was, however, stated in the beginning of the presentation that the utility of the invention can be best realized in the context of a telephone central office switching system. It is the purpose, therefore, of the following paragraphs to describe the use of the invention as the switching network of such a system.

Generic Description of Telephone Central Office

The primary function of a telephone switching system is, of course, to establish communiction links between subscriber telephones. In accomplishing this, the switching network performs the basic functions of transmitting the signals through the system, and of controlling these signals (switching) so that connections are made between the desired points. But the system as a whole must provide for:

1. the special purpose functions of:
   a. signaling
   b. sensing
   c. recording
2. the supervisory control of the entire calling process.

The signaling functions are those such as providing a dial tone, a ringing signal, a busy signal, etc.

The sensing functions are primarily concerned with detecting whether or not a given line is in use, and this reduces to detecting whether or not a given subscriber telephone is on- or off-hook.

The recording function is concerned with recording dial pulses or tone combinations which specify which number a subscriber wishes to call.

The supervisory control uses the information provided by the sensing devices to determine when to connect signaling or recording devices to a given line, sends the recorded dialing information to the network so that a proper connection can be made with the called telephone, and disengages the connection when it senses that the conversation has been terminated.

Therefore, it can be observed that, provisions have to be made to connect special purpose devices to the switching network itself.

Considerations of Interfacing and Signal Transmission

Another basic observation is that a telephone conversation is a two-way transfer of information. Telephone equipment exits which achieves two-way conversations using just a single pair of wires. In contrast, the electro-optical system is essentially uni-directional in nature. In addition to these factors, the electro-optical system must be matched with existing equipment regarding electrical parameters.

Conclusions Regarding Additional Means

From the above observations it can therefore be concluded that in order to use the invention as the switching system of a telephone central office the following additional means must be provided for:

1. Interfacing the electro-optical system with existing subscriber line and trunk line equipment. This interfacing has two aspects:
   a. interfacing regarding electrical parameters;
   b. interfacing regarding the bi-directional signal flow properties of a telephone line vs. the uni-directional properties of signal flow paths on the electro-optical system.
2. Achieving intra-system bi-directional communication for the electro-optical system which is essentially uni-directional.
3. Achieving the connection of special purpose devices to the electro-optical system by the supervisory control unit.

Subscriber Line Interfacing

Figure 5A:
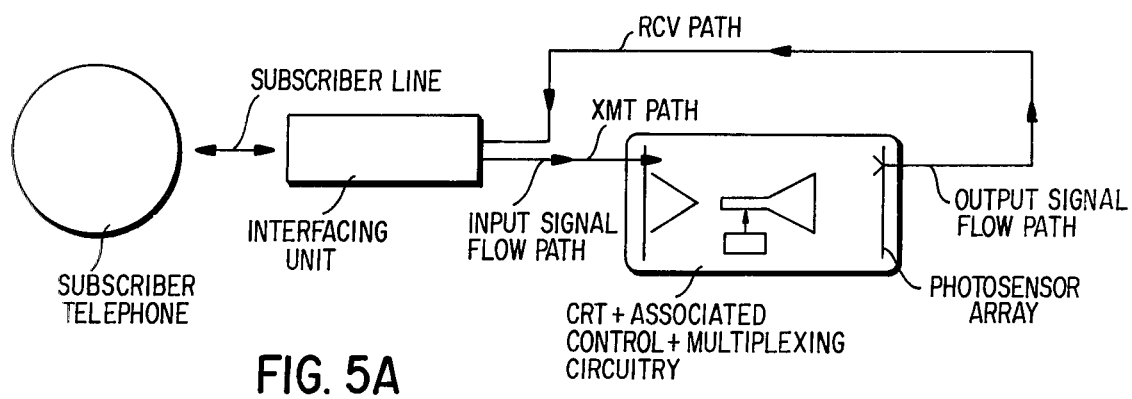
FIG. 5A illustrates the basic telephone system with the line interfacing unit.

A method for achieving compatibility between bi-directional telephone line equipment and the uni-directional electro-optical system is shown in FIG. 5A. The key unit in this diagram is shown in simple block form and is labeled "interfacing unit." The interfacing unit essentially splits the subscriber line path, which can both transmit and receive information, into two separate signal flow paths: one for transmitting information only, and one for receiving information only. Therefore, if a signal is traveling along the receive path, toward the subscriber telephone, the interfacing unit places this signal on the subscriber line of the telephone without allowing it to feed through to the transmit path. Such equipment has been well established in the present state of the art as one who is skilled in the art will know.

As further shown in FIG. 5A, the separate transmit and receive paths of the interfacing unit are connected with the electro-optical system by using a system input signal flow path as a transmit path, and by using a system output signal flow path as a receive path. The input path and the output path are considered as a functional pair and both are considered as associated with the same subscriber line. Maintaining this association is of particular importance when one considers assigning numbers to subscriber telephones in that the output path is associated with a given photosensor in the array and its location must be described by the proper numeric control information. Additional circuitry can be included in the interfacing unit for matching the electro-optical system with the electrical parameters of the external subscriber line equipment and trunk line equipment.

Figure 5B:
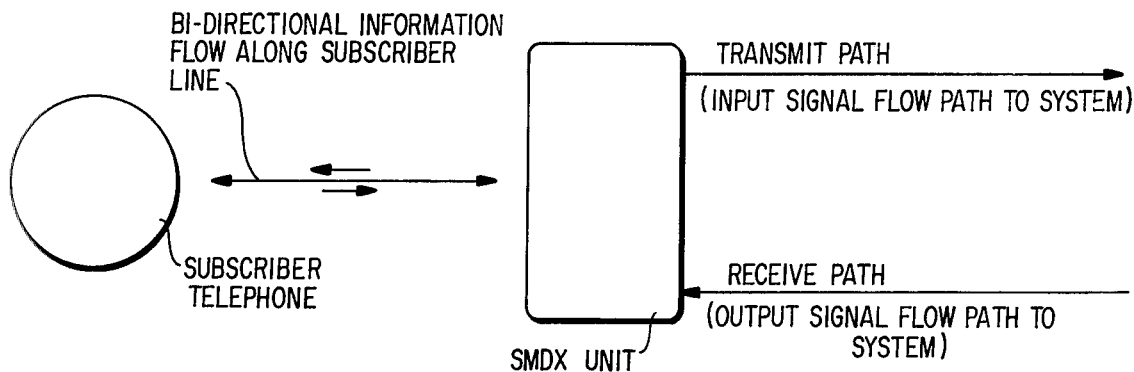
FIG. 5B illustrates a block diagram of the line interfacing unit.

In view of the functional aspects of this unit, it is deemed appropriate to call it a simplex-duplex conversion unit or SMDX unit. An enlarged block diagram of this unit is shown in FIG. 5B. Therefore, the SMDX unit provides the essential aspects of:
1. Interfacing the uni-directional signal flow paths of the electro-optical system with the bi-directional lines of external subscriber and trunk line equipment.
2. Matching electrical parameters between the electro-optical system and the external equipment.

Intra-System Bi-Directional Communication

Figure 6:
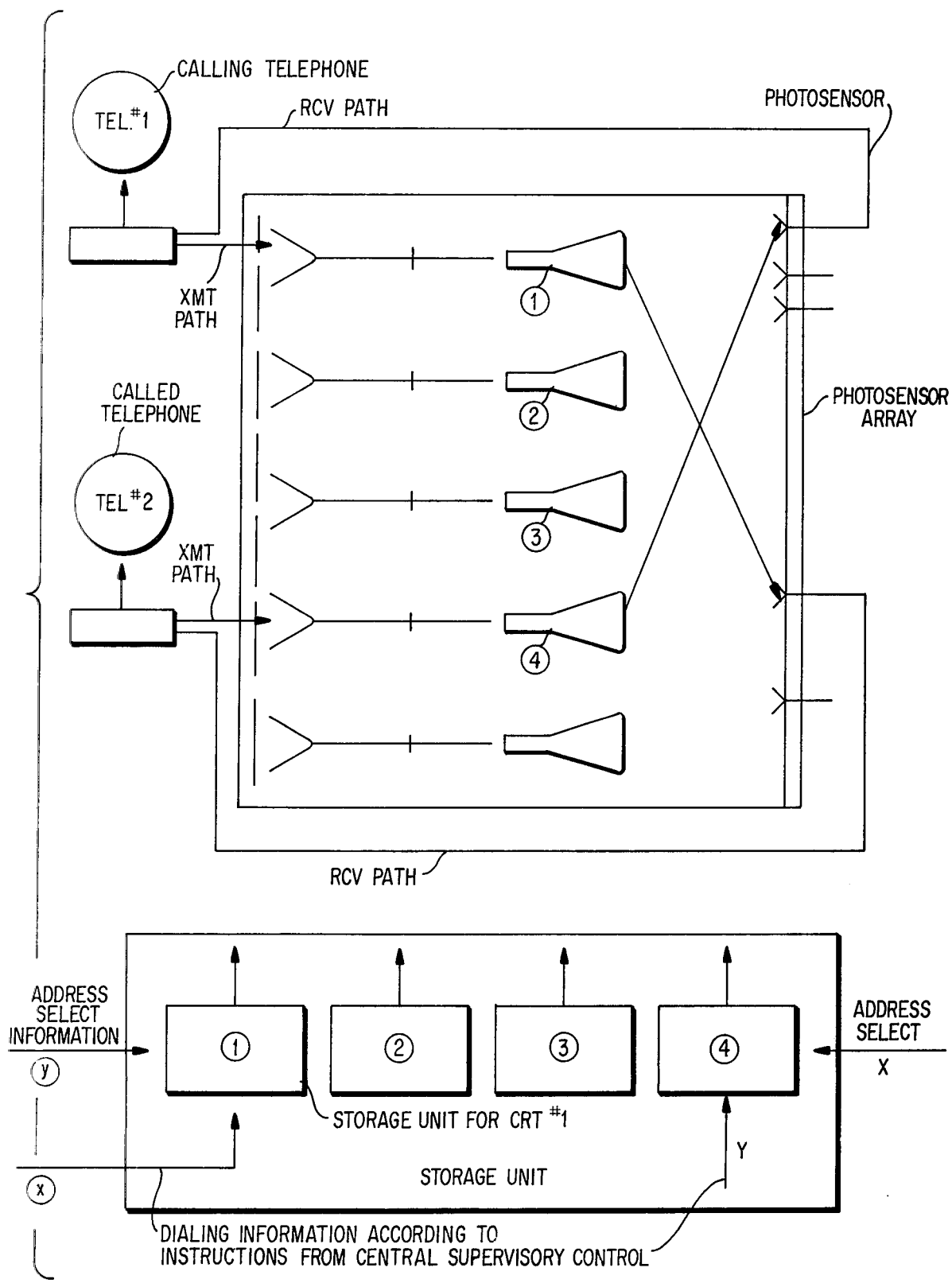
FIG. 6 illustrates a basic telephone system including the data unit for station selection.

The SMDX unit functions so as to provide for interfacing between the bi-directional signal flow paths of external equipment and the uni-directional signal flow paths of the electro-optical system. The remaining problem is that of establishing bi-directional communication for the intrasystem transfer of signals in view of the fact that the system is still essentially a uni-directional information transfer device. Bi-directional communication can be accomplished, however, by using the format shown in FIG. 6. In this diagram Tel. 1 initiates a call. This condition is sensed by the supervisory control circuitry (not shown) and the dialing information that is put into the system by the user of Tel. 1 to call a designated telephone is recorded. The supervisory control unit now has two specific sets of information:
1. the number of the telephone originating the call by virtue of the sensing functions;
2. the number that is being called by virtue of the dialed information. The supervisory control places the dialing information into the storage unit of CRT 1. In this case, the particular address selected corresponds with the number of the telephone originating the call, and the information placed in that address consists of the digits that were dialed. This is shown at the bottom of FIG. 6 where the address select signal is labeled Y (consisting of the number of the originating telephone), and the information stored at that location is labeled X (consisting of the dialed digits; the number of the called telephone). In accordance with the operation of the invention as thus far described, this procedure will direct any signal originated by Tel. 1 to Tel. 2. In order to establish communication from the called telephone (Tel. 2) back to the calling telephone (Tel. 1), the supervisory control need only reverse the role of the X and Y signals. This information is stored in storage unit 4 associated with CRT 4. The dialed digits (the X signal) are employed as address selection information and the number of the originating telephone (the Y signal) is the information stored at that address. Therefore, from the viewpoint of of CRT 4, the number of the originating telephone serves as switching information which directs the electron beam of CRT 4 to the photocell belonging to Tel. 1 (the originating telephone) thereby enabling the user of Tel. 2 to transmit a signal to Tel. 1 This results in a cross pair of light beams with each beam directed at the photosensor of the other telephone in the conversation pair.

There are two things to note about the above described situation:
1. Since time division multiplexing can be used with the CRT, the telephone inter-connection pair could conceivably be associated with the same CRT. This creates no problem, however, since the beam is simply time-shared between the photosensors. FIG. 6 does not shown this condition, but it should be pointed out that the diagram is in no way restrictive in this sense, and such a condition could readily be portrayed.
2. As shown in FIG. 6, each CRT has a storage unit specifically associated with it. Therefore, when the digital information that specifies a given subscriber telephone is used in the manner of address-selected information, means must be provided for having said digital information first specify a particular CRT-associated storage unit, and then specify an address within that particular storage unit. Such a function, can however be readily accomplished by the circuitry of the supervisory control unit.

Therefore, by the proper use of input-control information, the supervisory control unit can establish a bi-directional communication link within the electro-optical switching system.

Connection of Special-Purpose Devices

As was stated earlier, special purpose devices have to be connected to the electro-optical system at various stages in the calling process. This can readily be accomplished, however, by reserving signal input paths and photosensor output paths for these devices as the situation dictates. The supervisory control then simply directs a signal from a given signaling device (such as a dial tone generator) to the photosensor of the telephone requiring such a signal at a given time. Recording devices can be connected in a similar manner by having the supervisory control unit direct the dialing information transmitted by a telephone to a photosensor which is connected to a dial pulse recording device. This same approach can be used for other special purpose devices. The only exception would be the application of ringing voltage for a telephone. Since the ringing voltage is of a substantially greater magnitude then the other audio signals, alternate means must be provided connect it to a given subscriber line. This requirement, however, is in no way a serious restriction to the system as a whole.

Description of System Perspective

Figure 7:
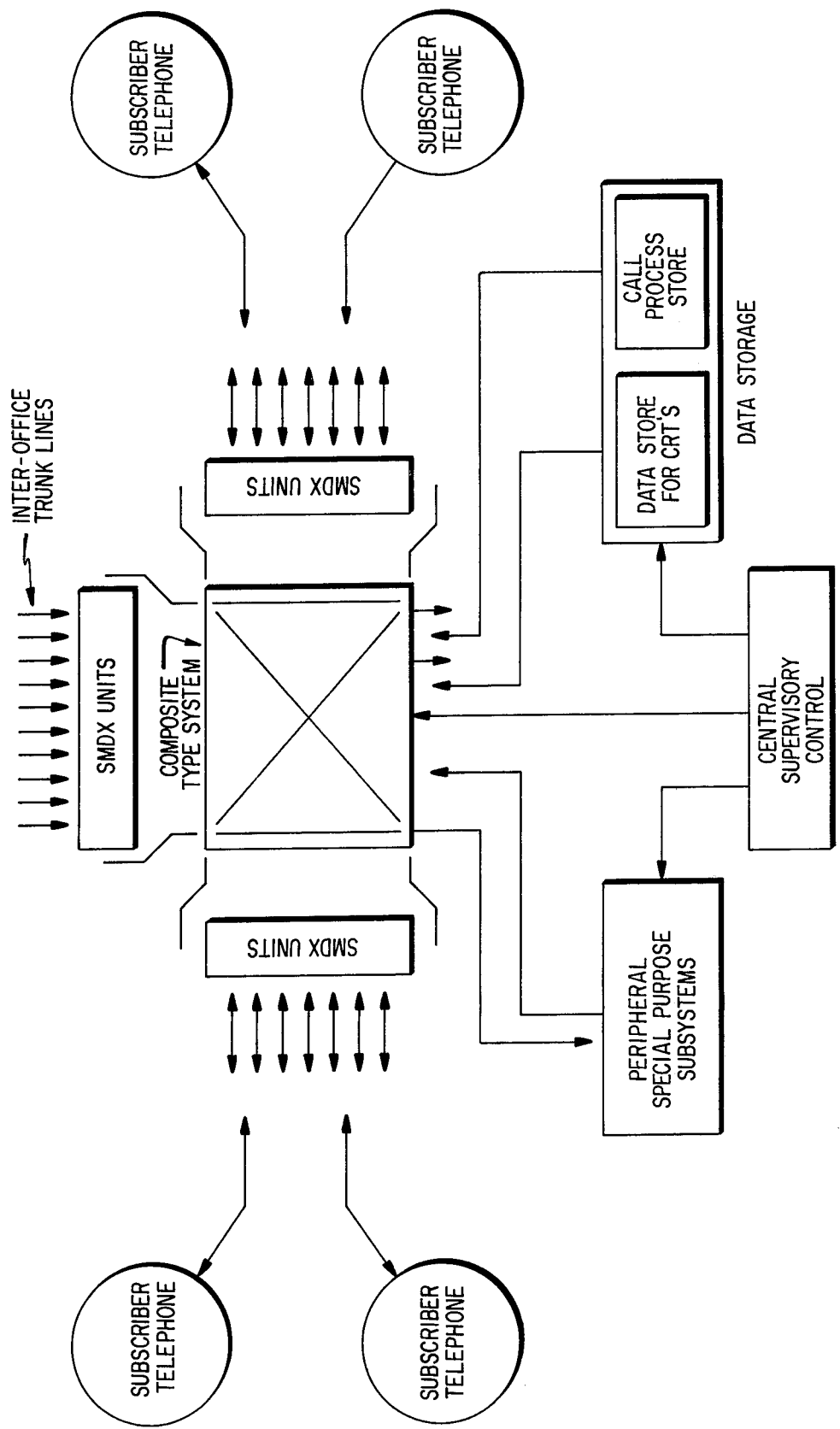
FIG. 7 illustrates the overall basic telephone system.

In order to gain a better perspective of how the various systems that have been discussed are related to each other within the context of the central office system, a systems diagram is shown in FIG. 7. The switching circuitry per se is symbolized by a rectangle with an X in the center. This block contains the multiplexing circuitry, the CRT's and their control circuitry, the focusing lenses for the CRT's and the photosensor array. The associated circuitry such as the data storage for the switching information provided to the CRt's is contained in the data storage block and is shown as a subsystem within the data storage system. The interface of the switching circuitry with the external equipment is shown by the long rectangular blocks labeled SMDX units.

The interface of the switching circuitry with the intra-system circuitry is more direct, and is shown by various signal flow paths that indicate information flow both to and from the switching circuitry itself. This intra-system circuitry is shown as being comprised of three blocks. The left hand block is labeled "peripheral special purpose subsystems" and contains all of the signaling, sensing, and recording devices necessary to the operation of the system.

The middle block contains the central supervisory control circuitry. This unit performs the logic-decision operations that are involved in processing a call. Consequently, it sends controlling information to the other systems in the office so that the proper subsystem is connected to the proper place at the proper time.

The right-hand block contains all the data storage utilized by the system. As it was previously pointed out, part of this storage consists of switching information for the CRT's. The other part of the storage consists of data utilized by the central supervisory control unit as it monitors the status of all the lines coming into the central office. Also contained in this part can be programming information which the supervisory control utilizes to perform its many operations.

This completes the systems description of the telephone central office switching system.

Rationale of Advantages

Problematics of Space Division Systems

Distribution of Control Signals

The substantial amounts of circuitry which were needed to distribute control signals to the elements of a switching network in prior systems, can be almost totally discarded because of this invention. The main reason for this is that this invention accomplishes the switching function WITHOUT USING A SWITCHING NETWORK. The functions of that network are replaced by a group of directed light signals. Furthermore, in order for subscriber A to transmit a signal to subscriber B, only ONE storage location is required, and the control information contained in that location is applied at only ONE physical point, the input of the D-A conv. units. The application of this control information at that one point is sufficient to reach ANY subscriber in the system. (Of course, a second storage location is needed for two-way conversation.)

Sensing and Locating Free Pathways through the Network

Again this problem is virtually eliminated, because there is no network. Consequently any switching information can be used with totally free acess to any desired subscriber line, and therefore there is no network blockage.

Furthermore, the interfacing between electronic control units and network elements poses no problem. No special provisions have to be made for this since the ONE control point, the D-A conversion input, is already compatible with electronic control equipment.

Connection of Special Purpose Devices during Call Processing

The connection of any special purpose subsystem is easily facilitated by the invention since any such device can be given its own transmit and receive terminations just like the other subscriber lines, and any transfer of information to or from any such device can be achieved in the same manner as an ordinary subscriber line. The same thing holds true for inter-office trunk lines which can also be given standard terminations. Any special functions associated with any such system and the supervision of the entire process can be directed by the central supervisory control unit of the system. Therefore, the invention again allows for substantial reduction in the amount of required circuitry.

Resultant Cost/Performance Limitations

Since this invention produces a significant reduction in component requirements, and a consequent reduction in cost; meeting cost performance requirements is made much easier. It has already been pointed out that the ability of this invention to accomplish the switching function without using a network of switching elements and hence the efficiency gained from discarding the components required by a network-based system is one main reason why this invention can reduce cost. It should also be pointed out, as part of the system's advantages, is the fact that each CRT unit, with the associated circuitry for time-division multiplexing, can be used in a composite structure with a number of other such units without any additional circuitry. And furthermore, each of these units is capable of reaching any termination in the entire system. The capabilities of this system greatly relax the restrictions placed upon the systems designer. The maximum traffic handling capability of the system can potentially be greatly increased without incurring unrealistic costs. The actual configuration of any such hypothetical system will be considered in light of prevailing traffic conditions, and will be decided upon by the systems designer, but he will have a wider range of alternatives to choose from.

System Reliability

As was mentioned before, electronic systems which gained advantages through electronic centralization of control functions also suffered specifically because of this fact in terms of achieving good systems reliability. The reason is that the central processor of such a system performs ALL the functions for the system, and if it stops, the system becomes inoperable. Therefore, expensive duplication of the central processor was provided to ensure system reliability. The system described in this invention also is intended for use with central electronic control, however, the unit-modular aspect of the individual time-division multiplexed CRT allows for indepedent central control on a unit per unit basis without an unjustifiable sacrifice of component efficiency in comparison to a single centralized system for a number of units. The alternative of using independent control units for each CRT multiplex unit allows for a system which would suffer only a relatively minor and limited loss of service if one control unit failed. Of course the composite system still does allow for control by a single central processor is such a design is desired. In either case the invention adds considerable flexibility to the design aspects of system control.

System Maintenance

Since the system projected by this invention does not have a switching network in the traditional sense, one of the main problems in system maintenance has been inherently eliminated. The problem referred to here is that of locating a malfunctioning component in a large and complex network of components.

Even if it were desired to assist in the maintenance of an electro-optical switching system with a diagnostic program, the size and complexity of the program would be reduced as compared to the diagnostic programs for electronic networkbased systems.

Relative Advantages Over TDM Systems

The key advantage which this system possesses over traditional TDM systems is the ability to form a composite system composed of individual multiplexed units with almost no additional circuitry. The individual multiplex units are simply used with a common photosensor array. Consequently, a system of relatively large size can be constructed without requiring the use of expensive interfacing circuitry, and the prohibitive effects of this on a practical basis. Therefore, the advantage of component versus signal throughout efficiency which a small TDM unit can achieve is retained in the use of such units in composite system structures. Such an ability is totally beyond the intrinsic design scope of previous TDM systems.

Summary Of Advantages

The rationale behind the advantages of this invention can be summarized as follows:

1. The ability of the electro-optical system to accomplish the switching function without the use of a network of individual switching elements, allows for the discarding of the problems and the resulting equipment requirements of any network-based system.

2. The use of time-division multiplexing takes advantage of the high efficiency per component results that the multiplexing approach affords. The essence of this is that the signal handling capacity of a given component (a CRT) can be greatly increased with a relatively small expenditure of additional equipment (the multiplexing circuitry). The electro-optical system, however, possesses additional advantages which enable individual multiplex units to be used in composite structures with other units on a common photosensor array. This is all accomplished with no additional circuitry requirements.

Conclusion

Other variations of the invention described will be apparent, and variations may be well be developed which employ more than ordinary skill in this art, but nevertheless employ the basic contribution and elements of this invention. Accordingly, patent protection should not be essentially limited by the preferred embodiments disclosed, but should be as provided by law with particular reference to the accompanying claims.

What is claimed is:

1. A switching system comprising an array of substantially contiguous radiation sensitive electrical circuit devices, means to selectively direct radiation to any selected one of said devices comprising means to respond to message destination information from incoming signals to cause direction of radiation to selected ones of said devices which correspond to said destination information, means to modulate said radiation in accordance with information, and separate electrical circuits connected with each of said devices to electrically transmit signals from said devices created in response to said modulated radiation.

2. The switching system as in claim 1 in which said means to selectively direct radiation comprises a cathode ray tube which generates said radiation at selected positions on its screen and said array comprises a plurality of individual photosensors.

3. The switching system as in claim 2 also comprising a stationary lens positioned between the screen of said cathode ray tube and said array to focus light generated on said screen to pre-selected areas on said array.

4. The switching system as in claim 2 also comprising an electrical amplifier in each said separate electrical circuit to amplify signals from the said photosensor connected with said circuit.

5. The switching system as in claim 3 also comprising an electrical amplifier in each said separate electrical circuit to amplify signals from the said photosensor connected with said circuit.

6. The switching system as in claim 5 also comprising digital to analogue conversion means to convert digital control signals to signals to control the horizontal and vertical axis deflection of said cathode ray tube.

7. A switching system comprising an array of individual photosensors, a cathode ray tube positioned to selectively direct light generated by said tube to any selected one of said photosensors, a plurality of electrical lines adapted to carry input signals, means to periodically connect individual ones of said lines to the beam-intensity control of said tube repetitively, means coordinated with said means to periodically connect to control the beam deflection within said tube so that signals from each said line are directed to different pre-selected ones of said photosensors, and control means to respond to message destination information from incoming signals to cause said means to control beam deflection to direct signals from each line to photosensors which correspond to said destination information.

8. The switching system as in claim 7 also comprising a generator of clock pulses substantially equally spaced in time, and wherein said means to periodically connect comprises a counter responsive to said clock pulses and a gate control network responsive to the status of said counter.

9. The switching system as in claim 8 wherein said means to control the deflection comprises a digital storage unit adapted to store deflection information for said tube, a data register to receive said deflection information and operatively apply it to said tube, and an address select register operative on said digital storage unit and responsive to the status of said counter.

10. The switching system as in claim 9 also comprising a supervisory control unit to control the insertion and extraction of data from said digital storage unit.

11. A switching system comprising an array of individual photosensors, at least two electron beam sources operative with at least one light generating screen in the basic design of a cathode ray tube to selectively direct said beams to selected areas of said screen, light directing means to direct light generated by all said beams on said screen to any selected one of said photosensors, and control means to respond to message destination information from incoming signals to cause said light directing means to direct light to photosensors which correspond to said destination information.

12. The switching system as in claim 11 wherein said at least two beam sources operative in the basic design of a cathode ray tube comprise at least two separate cathode ray tubes.

13. The switching system as in claim 11 also comprising at least one plurality of electrical lines adapted to carry input signals operatively associated with one of said beams, means to periodically connect individual ones of said lines to control the intensity of the beam associated with said lines repetitively, and means coordinated with said means to periodically connect to control the beam deflection between the beam source and said screen so that signals from each of said lines are directed to different pre-selected ones of said photosensors.

14. The switching system as in claim 12 also comprising at least one plurality of electrical lines adapted to carry input signals operatively associated with one of said beams, means to periodically connect individual ones of said lines to control the intensity of the beam associated with said lines repetitively, and means coordinated with said means to periodically connect to control the beam deflection within the tube so that signals from each said line are directed to different pre-selected ones of said photosensors.

15. The switching system as in claim 11 wherein said light directing means comprises an enlarging lens operatively associated with each area of said screen on which each of said beams is operative to generate light.

16. The switching system as in claim 12 wherein said light directing means comprises an enlarging lens operatively associated with each said cathode ray tube.

17. The switching system as in claim 15 also comprising at least one plurality of electrical lines adapted to carry input signals operatively associated with one of said beams, means to periodically connect individual ones of said lines to control the intensity of the beam associated with said lines repetitively, and means coordinated with said means to periodically connect to control the beam deflection between the beam source and said screen so that signals from each said line are directed to different pre-selected ones of said photosensors.

18. The switching system as in claim 16 also comprising at least one plurality of electrical lines adapted to carry input signals operatively associated with one of said beams, means to periodically connect individual ones of said lines to control the intensity of the beam associated with said lines repetitively, and means coordinated with said means to periodically connect to control the beam deflection within the tube so that signals from each said line are directed to different pre-selected ones of said photosensors.

19. A switching system comprising an array of individual photosensors, means comprising a cathode ray tube positioned to selectively direct light generated by said tube to selected ones of said photosensors and comprising means to respond to message destination information from incoming signals to cause light generated to be directed to selected ones of said photosensors which correspond to said destination information, a plurality of electrical lines adapted to carry input signals, a plurality of radiation generating devices, a different one of said electrical lines being connected to operate each of said devices to produce radiation modulated by the signal on the line, gating means connected to control each of said devices, gate control circuitry responsive to a cyclical input signal to open said gating means for each of said devices in response to a different status of the input signal so that all of said devices are gated open periodically and repetitively, means to direct the radiation generated by said devices to a radiation sensitive device, and a single electric circuit operatively connected to said radiation sensitive device and operatively connected to the beam-intensity control of said cathode ray tube.

20. The switching system as in claim 19 wherein said radiation generating devices are light emitting diodes.

21. The switching system as in claim 20 wherein said gate control circuitry comprises circuitry responsive to digital input information.

22. A telephone switching system comprising interfacing means to convert signals from telephones on single lines into two separate signals, one for receiving from the telephone and one for transmitting to the telephone, an array of substantially contiguous radiation sensitive electrical circuit devices, means to selectively direct radiation to any selected one of said devices, means to modulate said radiation in accordance with information received through said interfacing means, separate electrical circuits connected with each of said devices to electrically transmit signals received by the devices, and data storage and utilization means to receive information from a telephone describing the telephone transmitting and a telephone number called at the telephone transmitting and to utilize said information to control said means to selectively direct radiation so that received signals from said interfacing means from a telephone from which a telephone number is called are directed to a said circuit device connected to the receive line of the called telephone and the transmitted signal from said interfacing means from the called telephone is directed to a said circuit device connected to the receive line of the telephone from which the called telephone was called.

23. The telephone switching system as in claim 22 in which said means to selectively direct radiation comprises a cathode ray tube which generates said radiation at selected positions on its screen and said array comprises a plurality of individual photosensors.

24. The telephone switching system as in claim 23 also comprising a stationary lens positioned between the screen of said cathode ray tube and said array to focus light generated on said screen to preselected areas on said array.

25. The switching system as in claim 22 also comprising electronic application and control means to connect devices for sensing, signaling, and recording, in accordance with the requirements of telephone call processing, to the proper place within said switching system and at the correct time, and wherein said data storage and utilization means comprises supervisory control unit means, and wherein said means are responsive to control information from said supervisory control unit so that said supervisory control unit controls said electronic application and control means to fulfill the requirements of telephone call processing.

26. The switching system as in claim 23 also comprising electronic application and control means to connect devices for sensing, signaling, and recording, in accordance with the requirements of telephone call processing, to the proper place within said switching system and at the correct time, and wherein said data storage utilization means comprises supervisory control unit means, and wherein said means are responsive to control information from said supervisory control unit so that said supervisory control unit controls said electronic application and control means to fulfill the requirements of telephone call processing.

27. The switching system as in claim 24 also comprising electronic application and control means to connect devices for sensing, signaling, and recording, in accordance with the requirements of telephone call processing, to the proper place within said switching system and at the correct time, and wherein said data storage and utilization means comprises supervisory control unit means, and wherein said means are responsive to control information from said supervisory control unit so that said supervisory control unit controls said electronic application and control means to fulfill the requirements of telephone call processing.

28. A switching system comprising means to generate a directional beam of sensible emanations which travels in a substantially linear path unless disturbed, an array of substantially contiguous electrical circuit devices sensitive to said emanations, means to selectively direct said emanations to any selected one of said devices comprising means to respond to message destination information from incoming signals to cause direction of said beam to selected ones of said devices which correspond to said destination information, means to modulate said emanations in accordance with information, and separate electrical circuits connected with each of said devices to electrically transmit signals from said devices created in response to said modulated emanations.

29. The switching system as in claim 28 in which said means to generate a directional beam and said electrical circuit devices sensitive to said emanations are within the same evacuated envelope, said sensible emanations are cathode rays, said electrical circuit devices are electrically conductive areas, and said cathode rays are produced and directed and applied to said conductive areas within said envelope in a system operative in the basic design of a cathode ray tube.

30. The switching system as in claim 29 also comprising an electrical amplifier in each said separate electrical circuit to amplify signals from the said conductive area connected with said circuit.

31. The switching system as in claim 29 also comprising a plurality of electrical lines adapted to carry input signals, means to periodically connect individual ones of said lines to control the modulation of a said beam of sensible emanations, and means coordinated with said means to periodically connect to control said means to direct emanations so that signals from each said line are directed to different preselected ones of said sensitive devices.

32. The switching system as in claim 31 also comprising means responsive to said message destination information to determine a sequence of the said directing of said emanations which minimizes distances of beam movement between successive redirections of said emanations, and means to connect signals from said lines to carry input signals to modulate said emanations in said determined sequence.

33. The switching system as in claim 29 in which said system operative in the basic design of a cathode ray tube has at least two sources of directional beams of cathode rays, each of which beams can be selectively directed to any of said conductive areas and each of which beams can be modulated with information from different incoming messages.

34. The switching system as in claim 33 also comprising an electrical amplifier in each said separate electrical circuit to amplify signals from the said conductive area connected with said conduit.

35. The switching system as in claim 33 also comprising a plurality of electrical lines adapted to carry input signals, means to periodically connect individual ones of said lines to control the modulation of a said beam of sensible emanations, and means coordinated with said means to periodically connect to control said means to direct emanations so that signals from each said line are directed to different pre-selected ones of said sensitive devices.

36. The switching system as in claim 35 also comprising means responsive to said message destination information to determine a sequence of the said directing of said emanations which minimizes distances of beam movement between successive redirections of said emanations, and means to connect signals from said lines to carry input signals to modulate said emanations in said determined sequence.

37. The switching system as in claim 28 also comprising a plurality of electrical lines adapted to carry input signals, means to periodically connect individual ones of said lines to control the modulation of a said beam of sensible emanations, and means coordinated with said means to periodically connect to control said means to direct emanations so that signals from each said line are directed to different pre-selected ones of said sensitive devices.

38. The switching system as in claim 37 also comprising means responsive to said message destination information to determine a sequence of the said directing of said emanations which minimizes distances of beam movement between successive redirections of said emanations, and means to connect signals from said lines to carry input signals to modulate said emanations in the said determined sequence.

39. A switching system comprising an array of substantially contiguous radiation sensitive electrical circuit devices, means to selectively direct radiation to any selected one of said devices comprising means to respond to message destination information from incoming signals to cause direction of radiation to selected ones of said devices which correspond to said destination information, means to modulate said radiation in accordance with information, separate electrical circuits connected with each of said devices to electrically transmit signals from said devices created in response to said modulated radiation, a plurality of electrical lines adapted to carry input signals, means to periodically connect individual ones of said lines to control the modulation of said radiation, means coordinated with said means to periodically connect to control the direction of said radiation so that signals from each said line are directed to different ones of said devices, means responsive to said message destination information to determine a sequence of the said directing of said radiation which minimizes distances of movement of said radiation between successive redirections of said radiation, and means to connect signals from said lines to carry input signals to modulate said radiation in said determined sequence.

40. The switching system as in claim 39 which said means to selectively direct radiation comprises a cathode ray tube which generates said radiation at selected positions on its screen, and said array comprises a plurality of individual photosensors.

41. The switching system as in claim 40 also comprising a stationary lens positioned between the screen of said cathode ray tube and said array to focus light generated on said screen to preselected areas on said array.

42. The switching system as in claim 41 also comprising an electrical amplifier in each said separate electrical circuit to amplify signals from the said photosensor connected with said circuit.

* * * * *